US012609414B2

(12) United States Patent
Morimura et al.

(10) Patent No.: US 12,609,414 B2
(45) Date of Patent: Apr. 21, 2026

(54) NON-AQUEOUS SECONDARY BATTERY

(71) Applicant: Teijin Limited, Osaka (JP)

(72) Inventors: Wataru Morimura, Osaka (JP); Satoshi Nishikawa, Osaka (JP)

(73) Assignee: TEIJIN LIMITED, Osaka (JP)

( * ) Notice: Subject to any disclaimer, the term of this patent is extended or adjusted under 35 U.S.C. 154(b) by 528 days.

(21) Appl. No.: 18/006,669

(22) PCT Filed: Jul. 27, 2021

(86) PCT No.: PCT/JP2021/027797
§ 371 (c)(1),
(2) Date: Jan. 24, 2023

(87) PCT Pub. No.: WO2022/025081
PCT Pub. Date: Feb. 3, 2022

(65) Prior Publication Data

US 2023/0282936 A1 Sep. 7, 2023

(30) Foreign Application Priority Data

Jul. 28, 2020 (JP) ................................ 2020-127692
Jul. 28, 2020 (JP) ................................ 2020-127693
Jul. 28, 2020 (JP) ................................ 2020-127694

(51) Int. Cl.
*H01M 50/446* (2021.01)
*H01M 50/426* (2021.01)
*H01M 50/491* (2021.01)

(52) U.S. Cl.
CPC ....... *H01M 50/446* (2021.01); *H01M 50/426* (2021.01); *H01M 50/491* (2021.01)

(58) Field of Classification Search
CPC .......................... H01M 50/426; H01M 50/446
See application file for complete search history.

(56) References Cited

U.S. PATENT DOCUMENTS 5,882,721 A 3/1999 Delnick
6,692,873 B1 2/2004 Park et al.
(Continued)

FOREIGN PATENT DOCUMENTS

EP 3 627 586 A1 3/2020
EP 3 683 860 A1 7/2020
(Continued)

OTHER PUBLICATIONS

Machine translation of JP 2011-249207 (no date) (Year: 0000).*
(Continued)

*Primary Examiner* — Amanda C. Walke
(74) *Attorney, Agent, or Firm* — Sughrue Mion, PLLC

(57) ABSTRACT

A non-aqueous secondary battery, containing a positive electrode, a negative electrode, an insulating layer that is a single layer contacting the positive electrode on one side and the negative electrode on another side, and an electrolyte, in which (1) the insulating layer includes a polyvinylidene fluoride type resin and inorganic particles, the Mw of the polyvinylidene fluoride type resin is 900,000 to 1,500,000, and a content ratio of the inorganic particles in the insulating layer is 50% by mass to less than 90% by mass; (2) the insulating layer includes a resin and inorganic particles and has a thickness of 5 to 30 μm, and the inorganic particles include metal sulfate particles; or (3) the insulating layer includes a polyvinylidene fluoride type resin and inorganic
(Continued)

particles, the polyvinylidene fluoride type resin contains, as polymerizing components, vinylidene fluoride and a monomer represented by the following formula (1):

Formula (1)

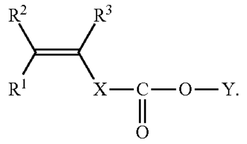

11 Claims, 1 Drawing Sheet

(56) References Cited

U.S. PATENT DOCUMENTS

| | | | | |
|---|---|---|---|---|
| 8,003,262 | B2 * | 8/2011 | Nakashima | H01M 4/133 429/251 |
| 12,255,351 | B2 * | 3/2025 | Jang | C08F 214/22 |
| 2002/0055038 | A1 | 5/2002 | Aihara et al. | |
| 2003/0170536 | A1 | 9/2003 | Aihara et al. | |
| 2006/0127753 | A1 | 6/2006 | Nakashima et al. | |
| 2011/0165473 | A1 | 7/2011 | Nakashima et al. | |
| 2012/0189898 | A1 | 7/2012 | Wakizaka et al. | |
| 2013/0089771 | A1 | 4/2013 | Nishikawa | |
| 2013/0089772 | A1 | 4/2013 | Nishikawa | |
| 2014/0272523 | A1 | 9/2014 | Otsuka et al. | |
| 2014/0377611 | A1 | 12/2014 | Kwon et al. | |
| 2014/0377612 | A1 | 12/2014 | Kwon et al. | |
| 2014/0377651 | A1 | 12/2014 | Kwon et al. | |
| 2015/0236323 | A1 | 8/2015 | Honda et al. | |
| 2016/0036027 | A1 | 2/2016 | Nishikawa | |
| 2018/0047962 | A1 | 2/2018 | Honda | |
| 2020/0006734 | A1 | 1/2020 | Murakami et al. | |
| 2020/0343511 | A1 * | 10/2020 | Nagao | H01M 50/454 |
| 2020/0411827 | A1 | 12/2020 | Kuratani et al. | |
| 2022/0123432 | A1 | 4/2022 | Murakami et al. | |

FOREIGN PATENT DOCUMENTS

| | | | | |
|---|---|---|---|---|
| JP | 2005-71978 | A | 3/2005 | |
| JP | 4077045 | B2 | 4/2008 | |
| JP | 2010-56037 | A | 3/2010 | |
| JP | 2010-73528 | A | 4/2010 | |
| JP | 2011-108516 | A | 6/2011 | |
| JP | 4790880 | B2 | 10/2011 | |
| JP | 2011-249207 | A | 12/2011 | |
| JP | 4988972 | B1 | 8/2012 | |
| JP | 5129895 | B2 | 1/2013 | |
| JP | 2013-122009 | A | 6/2013 | |
| JP | 2014-146616 | A | 8/2014 | |
| JP | 2015-191710 | A | 11/2015 | |
| JP | 5880555 | B2 | 3/2016 | |
| JP | 5938523 | B2 | 6/2016 | |
| JP | 2016-177962 | A | 10/2016 | |
| JP | 2017-123269 | A | 7/2017 | |
| JP | 6526359 | B1 | 6/2019 | |
| JP | 6597267 | B2 | 10/2019 | |
| JP | 2020-4729 | A | 1/2020 | |
| KR | 1020010038935 | A | 5/2001 | |
| KR | 10-2012-0091029 | A | 8/2012 | |
| KR | 20210042739 | A * | 4/2021 | H01M 50/446 |
| WO | 2013/133074 | A1 | 9/2013 | |
| WO | 2014/095907 | A1 | 6/2014 | |
| WO | 2018/212252 | A1 | 11/2018 | |
| WO | WO-2021138107 | A1 * | 7/2021 | H01M 50/451 |

OTHER PUBLICATIONS

International Search Report dated Oct. 12, 2021 issued by the International Searching Authority in Application No. PCT/JP2021/027797.

* cited by examiner

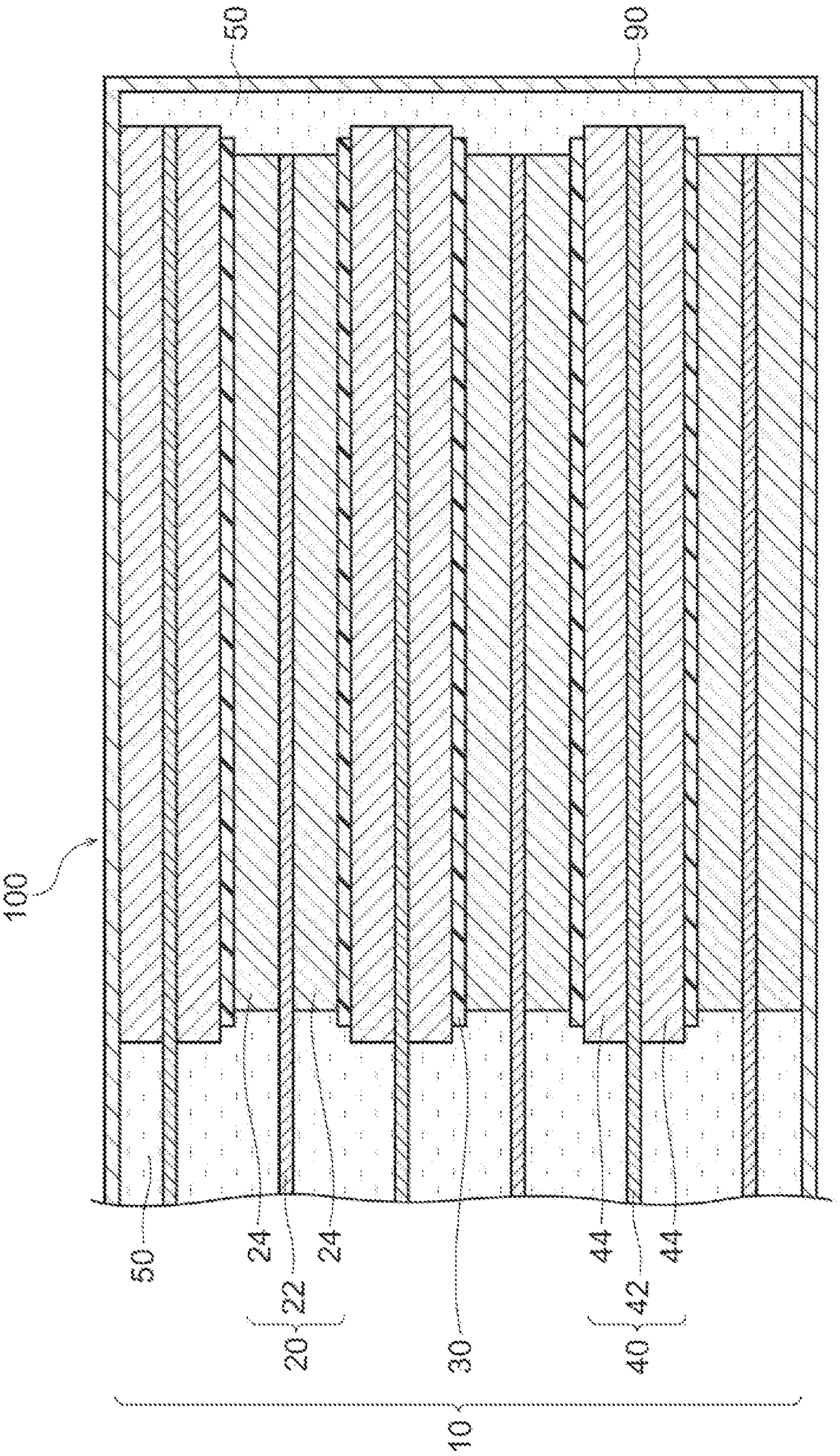
50
90
100
50
24
22
24
30
44
42
44
20
40
10

NON-AQUEOUS SECONDARY BATTERY

CROSS REFERENCE TO RELATED APPLICATIONS

This application is a National Stage of International Application No. PCT/JP2021/027797 filed Jul. 27, 2021, claiming priority based on Japanese Patent Application No. 2020-127692 filed Jul. 28, 2020, Japanese Patent Application No. 2020-127693 filed Jul. 28, 2020 and Japanese Patent Application No. 2020-127694 filed Jul. 28, 2020.

TECHNICAL FIELD

The present disclosure relates to a non-aqueous secondary battery.

BACKGROUND ART

In a non-aqueous secondary battery, an insulating layer or a separator is used for the purpose of insulating a positive electrode and a negative electrode.

For example, Japanese Patent Application Laid-Open (JP-A) No. 2010-056037 or Japanese Patent Application Laid-Open (JP-A) No. 2011-108516 discloses an electrode sheet for a non-aqueous electrolyte battery that includes an active material layer containing a positive electrode active material or a negative electrode active material, and a heat-resistant porous layer layered on the active material layer and containing a heat-resistant polymer and an inorganic filler.

For example, Japanese Patent Application Laid-Open (JP-A) No. 2015-191710 discloses a lithium ion secondary battery that includes a positive electrode, a negative electrode, a ceramic separator layer containing a fluorine type resin and insulating inorganic particles, a battery element containing a lithium ion conductive non-aqueous electrolyte, and an exterior body housing the battery element.

For example, Japanese Patent Application Laid-Open (JP-A) No. 2016-177962 discloses a method of manufacturing a secondary battery including: applying a separator layer forming composition containing two or more kinds of resin particles having different average particle diameters on an electrode; drying the separator layer forming composition applied on the electrode from a coated end portion to form a separator layer integrated with the electrode on the electrode; and constructing a secondary battery using the electrode on which the separator layer is formed, a counter electrode, and an electrolytic solution.

For example, Japanese Patent Application Laid-Open (JP-A) 2017-123269 discloses a separator electrode integrated power storage device for a lithium ion secondary battery in which a separator which is a porous layer containing magnesium hydroxide having an average particle size of 0.5 μm to 3.0 μm and an electrode are joined and integrated.

For example, Japanese Patent No. 4077045 discloses a battery including a positive electrode, a negative electrode, and an adhesive resin layer disposed between the positive electrode and the negative electrode and bonding at least one of the positive electrode and the negative electrode, in which the adhesive resin layer contains a filler having an average diameter of 0.01 μm to 1 μm and a resin.

For example, Japanese Patent No. 4790880 discloses a method of manufacturing a porous separator including: disposing a separator precursor solution containing a solid particulate material and a polymer binder on an electrode by screen printing; and changing the separator precursor solution into a porous separator in a form of a thin film.

For example, Japanese Patent No. 4988972 discloses a non-aqueous secondary battery using a separator including a porous substrate and an adhesive porous layer containing a polyvinylidene fluoride type resin and having a crystal size of 1 nm to 13 nm.

For example, Japanese Patent No. 5129895 discloses a non-aqueous secondary battery using a separator including a porous substrate and an adhesive porous layer containing a polyvinylidene fluoride type resin having a weight-average molecular weight of 600,000 to 3,000,000 and having a porosity of 30% to 60%.

For example, Japanese Patent No. 5880555 discloses a power storage device using a separator made of a composite material containing inorganic particles and an organic binder and having a ratio of a pigment volume concentration to a critical pigment volume concentration of 0.7 to 1.15.

For example, Japanese Patent No. 5938523 discloses a sheet-type secondary battery electrode including a current collector, an electrode active material layer formed on one surface of the current collector, an organic/inorganic porous layer formed on the electrode active material layer and containing inorganic particles and a binder polymer, and a porous first support layer formed on the organic/inorganic porous layer.

For example, Japanese Patent No. 6526359 discloses a non-aqueous secondary battery using a separator including a porous substrate, and a heat-resistant porous layer containing a binder resin and barium sulfate particles having an average primary particle size from 0.01 μm to less than 0.30 μm and having a volume ratio of the barium sulfate particles of 50 vol % to 90 vol %.

For example, Japanese Patent No. 6597267 discloses a lithium ion secondary battery including a positive electrode having a positive electrode active material layer, a negative electrode having a negative electrode active material layer, a separator, an electrolytic solution, and an inorganic particle layer containing $Al_2O_3$ and polyvinylidene fluoride disposed between the positive electrode active material layer or the negative electrode active material layer and the separator.

For example, International Application Laid-Open (WO-A) No. 2018/212252 discloses a non-aqueous secondary battery using a separator including a porous substrate and an adhesive porous layer containing a polyvinylidene fluoride type resin containing vinylidene fluoride and an acrylic monomer as monomer components and having a melting point of 130° C. to 148° C.

SUMMARY OF INVENTION

Technical Problem

A non-aqueous secondary battery is preferable to have excellent discharge characteristics, coulombic efficiency, and cell strength, that is, high reliability. An insulating layer, which is one of the members constituting the non-aqueous secondary battery, is required to have electrical insulation, ion permeability, adhesiveness to an electrode, and the like in order to enhance reliability of the non-aqueous secondary battery.

A first embodiment of the disclosure and a second embodiment of the disclosure were made under the above circumstances.

The first embodiment of the disclosure and the second embodiment of the disclosure provide a highly reliable non-aqueous secondary battery, and are to achieve this.

In addition, a non-aqueous secondary battery is preferable to be excellent in all of discharge characteristics, discharge capacity retention, characteristics that make it difficult to cause a micro-short circuit, and cell strength, that is, high reliability. An insulating layer, which is one of the members constituting the non-aqueous secondary battery, is required to have electrical insulation, ion permeability, adhesiveness to an electrode, stability to an electrolytic solution, and the like in order to enhance reliability of the non-aqueous secondary battery.

A third embodiment of the present disclosure has been made under the above circumstances.

The third embodiment of the disclosure provides a highly reliable non-aqueous secondary battery, and is to achieve this.

Solution to Problem

The first embodiment of the disclosure includes the following aspects.

<1> A non-aqueous secondary battery, containing:

a positive electrode;

a negative electrode;

an insulating layer that is a single layer contacting the positive electrode on one side and contacting the negative electrode on another side, the insulating layer comprising a polyvinylidene fluoride type resin and inorganic particles; and an electrolyte, wherein a weight-average molecular weight of the polyvinylidene fluoride type resin contained in the insulating layer is from 900,000 to 1,500,000, and wherein a content ratio of the inorganic particles in the insulating layer is from 50% by mass to less than 90% by mass.

<2> The non-aqueous secondary battery according to <1>, wherein the inorganic particles contain at least one selected from the group consisting of metal hydroxide particles and metal sulfate particles.

<3> The non-aqueous secondary battery according to <1> or <2>, wherein an average primary particle size of the inorganic particles contained in the insulating layer is from 0.01 μm to less than 1.00 μm.

<4> The non-aqueous secondary battery according to any one of <1> to <3>, wherein a thickness of the insulating layer is from 5 μm to 30 μm.

<5> The non-aqueous secondary battery according to any one of <1> to <4>, wherein a porosity of the insulating layer is from 40% to less than 80%.

<6> The non-aqueous secondary battery according to any one of <1> to <5>, wherein a mass per unit area of the insulating layer is from 4 $g/m^2$ to less than 40 $g/m^2$.

<7> The non-aqueous secondary battery according to any one of <1> to <6>, wherein the non-aqueous secondary battery obtains electromotive force by lithium doping and dedoping.

The second embodiment of the disclosure includes the following aspects.

<1> A non-aqueous secondary battery, containing:

a positive electrode;

a negative electrode;

an insulating layer that is a single layer contacting the positive electrode on one side and contacting the negative electrode on another side, the insulating layer comprising a polyvinylidene fluoride type resin and inorganic particles, the polyvinylidene fluoride type resin comprising, as polymerizing components, vinylidene fluoride and a monomer represented by the following formula (1); and an electrolyte:

Formula (1)

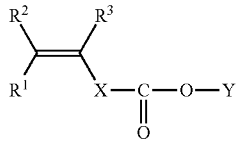

wherein, in Formula (1), each of $R^1$, $R^2$, and $R^3$ independently represents a hydrogen atom, a halogen atom, a $C_{1-5}$ alkyl group, a carboxyl group or a derivative of a carboxyl group; X represents a single bond, a $C_{1-5}$ alkylene group, or a substituted $C_{1-5}$ alkylene group; and Y represents a hydrogen atom, a $C_{1-5}$ alkyl group, a $C_{1-5}$ alkyl group that contains at least one hydroxy group, a $C_{1-5}$ alkyl group that contains at least one carboxyl group, or $—R—O—C(=O)—(CH_2)_n—C(=O)—OH$, wherein R represents a $C_{1-5}$ alkylene group and n represents an integer of 0 or more.

<2> The non-aqueous secondary battery according to <1>, wherein the inorganic particles contain at least one selected from the group consisting of metal hydroxide particles and metal sulfate particles.

<3> The non-aqueous secondary battery according to <1> or <2>, wherein an average primary particle size of the inorganic particles contained in the insulating layer is from 0.01 μm to less than 1.00 μm.

<4> The non-aqueous secondary battery according to any one of <1> to <3>, wherein a content ratio of the inorganic particles in the insulating layer is from 50% by mass to less than 90% by mass.

<5> The non-aqueous secondary battery according to any one of <1> to <4>, wherein a thickness of the insulating layer is from 5 μm to 30 μm.

<6> The non-aqueous secondary battery according to any one of <1> to <5>, wherein a porosity of the insulating layer is from 40% to less than 80%.

<7> The non-aqueous secondary battery according to any one of <1> to <6>, wherein a mass per unit area of the insulating layer is from 4 $g/m^2$ to less than 40 $g/m^2$.

<8> The non-aqueous secondary battery according to any one of <1> to <7>, wherein the non-aqueous secondary battery obtains electromotive force by lithium doping and dedoping.

The third embodiment of the disclosure includes the following aspects.

<1> A non-aqueous secondary battery, containing:

a positive electrode;

a negative electrode;

an insulating layer that is a single layer contacting the positive electrode on one side and contacting the negative electrode on another side, the insulating layer comprising a resin and inorganic particles; and an electrolyte, wherein a thickness of the insulating layer is from 5 μm to 30 μm, and wherein the inorganic particles include metal sulfate particles.

<2> The non-aqueous secondary battery according to <1>, wherein an average primary particle size of the inorganic particles contained in the insulating layer is from 0.01 μm to less than 1.00 μm.

<3> The non-aqueous secondary battery according to <1> or <2>, wherein the resin contains a polyvinylidene fluoride type resin.

<4> The non-aqueous secondary battery according to any one of <1> to <3>, wherein a content ratio of the inorganic particles in the insulating layer is from 50% by mass to less than 90% by mass.

<5> The non-aqueous secondary battery according to any one of <1> to <4>, wherein a porosity of the insulating layer is from 40% to less than 80%.

<6> The non-aqueous secondary battery according to any one of <1> to <5>, wherein a mass per unit area of the insulating layer is from 4 $g/m^2$ to less than 40 $g/m^2$.

<7> The non-aqueous secondary battery according to any one of <1> to <6>, wherein the non-aqueous secondary battery obtains electromotive force by lithium doping and dedoping.

Advantageous Effects of Invention

According to the first embodiment of the disclosure, it is possible to provide a highly reliable non-aqueous secondary battery.

According to the second embodiment of the disclosure, it is possible to provide a highly reliable non-aqueous secondary battery.

According to the third embodiment of the disclosure, it is possible to provide a highly reliable non-aqueous secondary battery.

BRIEF DESCRIPTION OF DRAWINGS

FIG. 1 is a schematic view showing an embodiment example of a non-aqueous secondary battery of the disclosure.

DESCRIPTION OF EMBODIMENTS

Hereinafter, the embodiments will be described. Further, the description and the Examples thereof illustrate the embodiments, but do not limit the scope of the embodiments.

Unless otherwise specified, a matter described as "of the disclosure" or "in the disclosure" is a matter common to the first embodiment, the second embodiment, and the third embodiment.

In the disclosure, "A and/or B" is synonymous with "at least one of A or B". That is, "A and/or B" optionally means only A, only B, or a combination of A and B.

In the disclosure, the numerical range denoted by using "to" represents the range inclusive of the number written before and after "to" as the minimum and maximum values.

Regarding stepwise numerical ranges designated in the disclosure, an upper or lower limit set forth in a certain numerical range may be replaced by an upper or lower limit of another stepwise numerical range described. Besides, an upper or lower limit set forth in a certain numerical range of the numerical ranges designated in the disclosure may be replaced by a value indicated in Examples.

In the disclosure, the term "step" includes not only an independent step, but also the step which is not clearly distinguished from other steps but achieves the desired purpose thereof.

When an embodiment is described with reference to the drawings in the present disclosure, the configuration of the embodiment is not limited to the configuration illustrated in the drawings. In addition, the sizes of the members in each drawing are conceptual, and the relative relationship between the sizes of the members is not limited thereto.

In the disclosure, when the amount of each component in a composition is referred to and when a plurality of substances corresponding to each component are present in the composition, the total amount of the plurality of components present in the composition is meant unless otherwise specified.

A plurality of kinds of particles corresponding to each component in the disclosure may be contained. When there are a plurality of kinds of particles corresponding to each component in a composition, a particle diameter of each component means a value for a mixture of the plurality of kinds of particles present in the composition unless otherwise specified.

<Non-Aqueous Secondary Battery>

The technology of the disclosure relates to a secondary battery in which an electrolytic solution does not contain water, that is, a non-aqueous secondary battery. An example of an embodiment of the non-aqueous secondary battery of the disclosure is a lithium ion secondary battery that obtains an electromotive force by doping and de-doping of lithium ions.

<<Non-Aqueous Secondary Battery of First Embodiment>>

The non-aqueous secondary battery of the first embodiment contains a positive electrode, a negative electrode, an insulating layer and an electrolyte. The insulating layer is a single layer contacting the positive electrode on one side and contacting the negative electrode on another side, and the insulating layer contains a polyvinylidene fluoride type resin and inorganic particles. A weight-average molecular weight of the polyvinylidene fluoride type resin contained in the insulating layer is from 900,000 to 1,500,000, and a content ratio of the inorganic particles in the insulating layer is from 50% by mass to less than 90% by mass.

Hereinafter, a "positive electrode" and a "negative electrode" are collectively referred to as an "electrode". In addition, a "non-aqueous secondary battery of a first embodiment" is also simply referred to as a "battery".

In the battery of the first embodiment, since the insulating layer is a single layer, (1) there is no boundary between layers inside an insulating layer, whereby an electrical resistance of the insulating layer can be suppressed to be low and the discharge characteristics and the coulomb efficiency of the battery can be enhanced, and (2) delamination does not occur inside the insulating layer, whereby the coulomb efficiency and the cell strength of the battery can be enhanced.

In the battery of the first embodiment, a weight-average molecular weight (Mw) of a polyvinylidene fluoride type resin contained in the insulating layer is 900,000 to 1.5 million.

The Mw of the polyvinylidene fluoride type resin is 900,000 or more from the viewpoint of enhancing the electrical insulation property of the insulating layer, suppressing blocking of pores of the insulating layer to improve ion permeability, and enhancing discharge characteristics of the battery. When the Mw of the polyvinylidene fluoride type resin is less than 900,000, the electrical insulation property of the insulating layer may be insufficient. In addition, when the Mw of the polyvinylidene fluoride type resin is less than 900,000, the pores of the insulating layer may be blocked when heat is applied to the insulating layer during manufacturing the battery, and the discharge characteristics of the battery deteriorate.

The Mw of the polyvinylidene fluoride type resin is 1.5 million or less from the viewpoint of improving an adhesion between the insulating layer and the electrode and increasing the coulombic efficiency and cell strength of the battery. When the Mw of the polyvinylidene fluoride type resin is more than 1.5 million, the polyvinylidene fluoride type resin is less likely to soften when heat is applied to the insulating layer during the manufacture of the battery, whereby the insulating layer may not sufficiently adhere to the electrode and a gap may be generated between the insulating layer and the electrode. As a result, the coulombic efficiency and the cell strength of the battery deteriorate.

In the battery of the first embodiment, the content ratio of the inorganic particles in the insulating layer is from 50% by mass to less than 90% by mass.

The content ratio of the inorganic particles in the insulating layer is 50% by mass or more from the viewpoint of enhancing the electrical insulation property of the insulating layer, enhancing the porosity of the insulating layer to improve the ion permeability, and enhancing the discharge characteristics of the battery. When the content ratio of the inorganic particles in the insulating layer is less than 50% by mass, the electrical insulation property of the insulating layer may be insufficient. In addition, when the content ratio of the inorganic particles in the insulating layer is less than 50% by mass, the porosity of the insulating layer is not sufficient, and the discharge characteristics of the battery are poor.

The content ratio of the inorganic particles in the insulating layer is less than 90% by mass from the viewpoint of enhancing the mechanical strength of the insulating layer, improving the adhesion between the insulating layer and the electrode, and enhancing the coulombic efficiency and the cell strength of the battery. When the content ratio of the inorganic particles in the insulating layer is 90% by mass or more, the gap may be generated between the insulating layer and the electrode, and the coulombic efficiency and the cell strength of the battery deteriorate. In addition, when the content ratio of the inorganic particles occupied in the insulating layer is 90% by mass or more, the insulating layer may be brittle.

By the synergistic action of the above configurations, the non-aqueous secondary battery of the first embodiment is excellent in the discharge characteristics, the coulombic efficiency, and the cell strength, whereby the non-aqueous secondary battery has high reliability.

Hereinafter, the configuration of the non-aqueous secondary battery of the first embodiment will be described in detail.

[Positive Electrode of First Embodiment]

A positive electrode includes, for example, a current collector and a positive electrode active material layer disposed on one side or both sides of the current collector.

Examples of the current collector of the positive electrode include a metal foil. Examples of the metal foil include an aluminum foil, a titanium foil, a stainless steel foil, and the like. A thickness of the current collector of the positive electrode is preferably 5 μm to 20 μm.

The positive electrode active material layer preferably contains a positive electrode active material and a resin. The positive electrode active material layer may further contain a conductive aid.

Examples of the positive electrode active material include a lithium-containing transition metal oxide. Examples of the lithium-containing transition metal oxide include $LiCoO_2$, $LiNiO_2$, $LiMn_{1/2}Ni_{1/2}O_2$, $LiCo_{1/3}Mn_{1/3}Ni_{1/3}O_2$, $LiMn_2O_4$, $LiFePO_4$, $LiCo_{1/2}Ni_{1/2}O_2$, $LiAl_{1/4}Ni_{3/4}O_2$, the like.

Examples of the resin include a polyvinylidene fluoride type resin, an alginate salt, and the like.

Examples of the conductive aid include a carbon material. Examples of the carbon material include acetylene black, Ketjen black, carbon fiber, and the like.

[Negative Electrode of First Embodiment]

The negative electrode includes, for example, a current collector and a negative electrode active material layer disposed on one side or both sides of the current collector.

Examples of the current collector of the negative electrode include a metal foil. Examples of the metal foil include a copper foil, a nickel foil, a stainless steel foil, and the like. A thickness of the current collector of the negative electrode is preferably 5 μm to 20 μm.

The negative electrode active material layer preferably contains a negative electrode active material and a resin. The negative electrode active material layer may further contain a conductive aid.

Examples of the negative electrode active material include a material capable of electrochemically absorbing lithium ions. Examples of the material include a carbon material; an alloy of lithium and silicon, silicon compound, tin, aluminum, or the like; a Wood's alloy; and the like.

Examples of the resin include a polyvinylidene fluoride type resin, a styrene-butadiene copolymer, carboxymethyl cellulose, and the like.

Examples of the conductive aid include a carbon material. Examples of the carbon material include acetylene black, Ketjen black, carbon fiber, and the like.

[Insulating Layer of First Embodiment]

The insulating layer of the disclosure has a large number of micropores provided therein, and has a porous structure in which these micropores are connected, and is a single layer that allows gas or liquid to pass from one side to the other.

An example of the embodiment of the insulating layer of the disclosure has one surface in contact with the positive electrode active material layer and the other surface in contact with the negative electrode active material layer.

The insulating layer of the first embodiment contains a polyvinylidene fluoride type resin and inorganic particles. The insulating layer may contain resins other than the polyvinylidene fluoride type resin, organic fillers, and the like.

—Polyvinylidene Fluoride Type Resin of First Embodiment—

Examples of the polyvinylidene fluoride type resin include a homopolymer (that is, polyvinylidene fluoride) of vinylidene fluoride; a copolymer of vinylidene fluoride and halogen-containing monomers such as hexafluoropropylene, tetrafluoroethylene, trifluoroethylene, chlorotrifluoroethylene, vinyl fluoride, and trichloroethylene; and mixtures thereof. The polyvinylidene fluoride type resin may be used singly, or may be used in combination of two or more thereof.

As the polyvinylidene fluoride type resin, it is preferably a copolymer of vinylidene fluoride (VDF) and hexafluoropropylene (HFP) (VDF-HFP copolymer) from the viewpoint of the adhesiveness of the insulating layer to the electrode. In the disclosure, the VDF-HFP copolymer includes both a copolymer obtained by polymerizing only the VDF and HFP (VDF-HFP binary copolymer) and a copolymer obtained by polymerizing the VDF, the HFP, and other monomers. Here, examples of other monomers include halogen-containing monomers such as tetrafluoroethylene, trifluoroethylene, chlorotrifluoroethylene, vinyl fluoride, and trichloroethylene.

The VDF-HFP copolymer can control crystallinity of the copolymer, the adhesion to the electrode active material layer, the resistance to dissolution in the electrolytic solution, and the like to be within an appropriate range by increasing or decreasing the content of the HFP unit.

In a VDF-HFP copolymer, a ratio of HFP in all polymerization components is preferably more than 1.0 mol %, more preferably more than 1.5 mol %, still more preferably 2.0 mol % or more, still more preferably 2.2 mol % or more, preferably 7.0 mol % or less, more preferably 6.5 mol % or less, and still more preferably 6.0 mol % or less.

The weight-average molecular weight (Mw) of the polyvinylidene fluoride type resin contained in the insulating layer of the first embodiment is from 900,000 to 1,500,000.

When the Mw of the polyvinylidene fluoride type resin is 900,000 or more, the electrical insulation property of the insulating layer is preferable, and further, when heat is applied to the insulating layer during the manufacture of the battery, the pores of the insulating layer are less likely to be blocked. From this viewpoint, the Mw of the polyvinylidene fluoride type resin is 900,000 or more, preferably 1 million or more, and more preferably 1.1 million or more.

When the Mw of the polyvinylidene fluoride type resin is 1.5 million or less, the insulating layer and the electrode adhere well when heat is applied to the insulating layer during the manufacture of the battery, and a gap is hardly generated between the insulating layer and the electrode. From this viewpoint, the Mw of the polyvinylidene fluoride type resin is 1.5 million or less, preferably 1.4 million or less, and more preferably 1.3 million or less.

The content ratio of the polyvinylidene fluoride type resin in the insulating layer of the first embodiment is preferably 10% by mass to 50% by mass, more preferably 15% by mass to 50% by mass, and still more preferably 20% by mass to 50% by mass.

The content of the polyvinylidene fluoride type resin contained in the insulating layer of the first embodiment is preferably 85% by mass to 100% by mass, more preferably 90% by mass to 100% by mass, and still more preferably 95% by mass to 100% by mass based on the total amount of all the resins contained in the insulating layer.

—Other Resins in First Embodiment—

The insulating layer may contain resins other than the polyvinylidene fluoride type resin. Examples of the other resins include an acrylic type resin, a fluorinated rubber, a styrene-butadiene copolymer, a homopolymer or a copolymer of vinyl nitrile compounds (acrylonitrile, methacrylonitrile, and the like), carboxymethyl cellulose, hydroxyalkyl cellulose, polyvinyl alcohol, polyvinyl butyral, polyvinyl pyrrolidone, polyether (polyethylene oxide, polypropylene oxide, and the like), polyamide, wholly aromatic polyamide (also referred to as aramid), polyimide, polyamideimide, polysulfone, polyketone, polyether ketone, polyether sulfone, polyether imide, and mixtures thereof.

The content of other resins other than the polyvinylidene fluoride type resin contained in the insulating layer of the first embodiment is preferably 0% by mass to 15% by mass, more preferably 0% by mass to 10% by mass, and still more preferably 0% by mass to 5% by mass based on the total amount of all the resins contained in the insulating layer.

—Inorganic Particles of First Embodiment—

The particle shape of the inorganic particles is not limited, and may be any of a spherical shape, a plate shape, a needle shape, and an amorphous shape. The inorganic particles are preferably spherical or plate-shaped particles from the viewpoint of suppressing a short circuit of the battery or from the viewpoint of easily filling the insulating layer densely.

The material of the inorganic particles is not limited. Examples of the inorganic particles include metal hydroxide particles, metal sulfate particles, metal oxide particles, metal carbonate particles, metal nitride particles, metal fluoride particles, clay mineral particles, and the like. The inorganic particles may be used singly or in combination of two or more kinds thereof.

Examples of the metal hydroxide particles include particles of magnesium hydroxide ($Mg(OH)_2$), particles of aluminum hydroxide ($Al(OH)_3$), particles of calcium hydroxide ($Ca(OH)_2$), and particles of nickel hydroxide ($Ni(OH)_2$). As the metal hydroxide particles, the particles of magnesium hydroxide are preferable.

Examples of the metal sulfate particles include particles of barium sulfate ($BaSO_4$), particles of strontium sulfate ($SrSO_4$), particles of calcium sulfate ($CaSO_4$), particles of calcium sulfate dihydrate ($CaSO_4 \cdot 2H_2O$), particles of alunite ($KAl_3(SO_4)_2(OH)_6$), and particles of jarosite ($KFe_3(SO_4)_2(OH)_6$). As the metal sulfate particles, particles of barium sulfate are preferable.

Examples of the metal oxide particles include particles of magnesium oxide, particles of alumina ($Al_2O_3$), particles of boehmite (AlOOH, alumina monohydrate), particles of titania ($TiO_2$), particles of silica ($SiO_2$), particles of zirconia ($ZrO_2$), particles of barium titanate ($BaTiO_3$), and particles of zinc oxide.

Examples of the metal carbonate particles include particles of magnesium carbonate, and particles of calcium carbonate.

Examples of the metal nitride particles include particles of magnesium nitride, particles of aluminum nitride, particles of calcium nitride, and particles of titanium nitride.

Examples of the metal fluoride particles include particles of magnesium fluoride and particles of calcium fluoride.

Examples of the clay mineral particles include particles of calcium silicate, particles of calcium phosphate, particles of apatite, and particles of talc.

The inorganic particles are preferably the metal hydroxide particles from the viewpoint of flame retardancy, and the inorganic particles are preferably the metal sulfate particles from the viewpoint of being stable with respect to an electrolytic solution and suppressing gas generation. The inorganic particles preferably include at least one selected from the group consisting of metal hydroxide particles and metal sulfate particles.

An average primary particle size of the inorganic particles contained in the insulating layer is preferably 0.01 μm or more, more preferably 0.02 μm or more, and still more preferably 0.03 μm or more from the viewpoint of making the insulating layer porous to increase the ion permeability.

The average primary particle size of the inorganic particles contained in the insulating layer is preferably less than 1.00 μm, more preferably less than 0.95 μm, and still more preferably less than 0.90 μm from the viewpoint of thinning the insulating layer to increase the energy density of the battery.

Two or more kinds of inorganic particles having different average primary particle sizes may be used in combination as the inorganic particles, and in that case, each average primary particle size is preferably in the above range, and the overall average primary particle size is preferably in the above range.

The average primary particle size of the inorganic particles is obtained by measuring major diameters of 100 primary particles randomly selected in observation with a scanning electron microscope (SEM), and averaging the major diameters of 100 primary particles. When the primary particle size of the inorganic particles is small and it is difficult to measure the major axis of the primary particles by SEM, and/or when the aggregation of the inorganic particles is remarkable and it is difficult to measure the major axis of the primary particles by SEM, a BET specific surface area ($m^2/g$) of the inorganic particles is measured, and the average primary particle size is obtained according to the following Formula assuming that the inorganic particles are spheres.

$$\text{Average primary particle size } (\mu m)=6\div[\text{specific gravity } (g/cm^3)\times\text{BET specific surface area } (m^2/g)]$$

The BET specific surface area ($m^2/g$) is obtained by a BET multipoint method that is a gas adsorption method using nitrogen gas. In the measurement by the gas adsorption method, the nitrogen gas is adsorbed on the inorganic particles at a boiling point temperature (−196° C.) of liquid nitrogen.

A sample to be subjected to the observation by the SEM or the measurement of the BET specific surface area is inorganic particles which are materials for forming the insulating layer or inorganic particles taken out from the insulating layer. The method of taking out the inorganic particles from the insulating layer is not limited, and examples of the method include a method of removing a binder resin by heating an insulating layer to about 800° C. and take out inorganic particles, a method of immersing a separator in an organic solvent to dissolve a binder resin with an organic solvent and take out inorganic particles, and the like.

The content ratio of the inorganic particles in the insulating layer of the first embodiment is 50% by mass or more, preferably 55% by mass or more, and more preferably 65% by mass or more from the viewpoint of enhancing the electrical insulation property of the insulating layer, enhancing the porosity of the insulating layer to improve the ion permeability, and enhancing the discharge characteristics of the battery.

The content ratio of the inorganic particles occupied in the insulating layer of the first embodiment is less than 90% by mass, preferably less than 88% by mass, and more preferably less than 85% by mass from the viewpoint of improving the adhesion between the insulating layer and the electrode and increasing the coulombic efficiency and the cell strength of the battery.

—Organic Filler of First Embodiment—

Examples of the organic filler include particles of a crosslinked polymer such as crosslinked poly(meth)acrylic acid, crosslinked poly (meth)acrylate, crosslinked polysilicone, crosslinked polystyrene, crosslinked polydivinylbenzene, a styrene-divinylbenzene copolymer crosslinked product, a melamine resin, a phenol resin, or a benzoguanamine-formaldehyde condensate; and particles of a heat resistant polymer such as polysulfone, polyacrylonitrile, aramid, or polyacetal. These organic fillers may be used singly or in combination of two or more kinds thereof. In the disclosure, the notation “(meth)acryl” means either “acryl” or “methacryl”.

—Other Components of First Embodiment—

The insulating layer may contain an additive, for example, a dispersant such as a surfactant, a wetting agent, an antifoaming agent, or a pH adjuster. The additive may be added to a coating liquid for forming the insulating layer.

[Characteristics of Insulating Layer of First Embodiment]

The thickness of the insulating layer is preferably 5 μm or more, more preferably 6.0 μm or more, and still more preferably 7.0 μm or more from the viewpoint of electrical insulation property and mechanical strength of the insulating layer, and is preferably 30 μm or less, more preferably 25 μm or less, and still more preferably 20 μm or less from the viewpoint of ion permeability or energy density of a battery.

The mass per unit area of the insulating layer is preferably 4 $g/m^2$ or more, more preferably 5 $g/m^2$ or more, and still more preferably 9 $g/m^2$ or more from the viewpoint of the electrical insulation property and mechanical strength of the insulating layer, and is preferably less than 40 $g/m^2$, more preferably less than 35 $g/m^2$, and still more preferably less than 30 $g/m^2$ from the viewpoint of ion permeability or energy density of a battery.

The porosity of the insulating layer is preferably 40% or more, more preferably 42% or more, and still more preferably 46% or more from the viewpoint of the ion permeability, and is preferably less than 80%, more preferably less than 75%, and still more preferably less than 65% from the viewpoint of electrical insulation property and mechanical strength of the insulating layer.

The porosity ε (%) of the insulating layer is obtained by the following method.

The mass per unit area of the insulating layer is divided by the thickness of the insulating layer, thereby obtaining a bulk density d1 of the insulating layer. A true density d0 of the insulating layer is calculated from the following Formula (1). Then, the porosity ε (%) of the insulating layer is calculated from the following Formula (2).

$$d0=100/(\text{resin solid content ratio of insulating layer/density of resin}+\text{inorganic particle solid content ratio of insulating layer/density of inorganic particle}) \quad \text{Formula (1)}$$

$$\varepsilon=(1-d1/d0)\times 100 \quad \text{Formula (2)}$$

[Electrolyte Solution of First Embodiment]

The electrolyte solution is, for example, a solution in which a lithium salt is dissolved in a non-aqueous solvent.

Examples of the lithium salt include $LiPF_6$, $LiBF_4$, and $LiClO_4$.

Examples of the non-aqueous solvent include cyclic carbonates such as ethylene carbonate, propylene carbonate, fluoroethylene carbonate, difluoroethylene carbonate, and vinylene carbonate; chain carbonates such as dimethyl carbonate, diethyl carbonate, ethyl methyl carbonate, and a fluorine-substituted compound thereof; and cyclic esters such as γ-butyrolactone and γ-valerolactone. These non-aqueous solvent may be used singly, or in combination.

As the electrolyte solution for a lithium ion secondary battery, a solution is preferred, which is obtained by mixing a cyclic carbonate and a chain carbonate at a content ratio (cyclic carbonate:chain carbonate) of from 20:80 to 40:60, and dissolving a lithium salt therein to give a concentration of from 0.5 mol/L to 1.5 mol/L.

<<Non-Aqueous Secondary Battery of Second Embodiment>>

The non-aqueous secondary battery of the second embodiment contains a positive electrode, a negative electrode, an insulating layer and an electrolyte. The insulating layer is a single layer contacting the positive electrode on one side and contacting the negative electrode on another side. The insulating layer contains a polyvinylidene fluoride type resin that contains, as polymerizing components, vinylidene fluoride and a monomer represented by the following formula (1), and inorganic particles. Hereinafter, the polyvinylidene fluoride type resin that contains, as polymerizing components, vinylidene fluoride and a monomer represented by the following formula (1) is also referred to as “PVDF resin (1)”.

Formula (1)

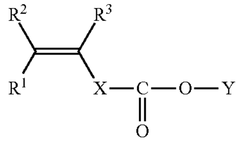

wherein, in Formula (1), each of $R^1$, $R^2$, and $R^3$ independently represents a hydrogen atom, a halogen atom, a $C_{1-5}$ alkyl group, a carboxyl group or a derivative of a carboxyl group; X represents a single bond, a $C_{1-5}$ alkylene group, or a substituted $C_{1-5}$ alkylene group; and Y represents a hydrogen atom, a $C_{1-5}$ alkyl group, a $C_{1-5}$ alkyl group that contains at least one hydroxy group, a $C_{1-5}$ alkyl group that contains at least one carboxyl group, or $—R—O—C(=O)—(CH_2)_n—C(=O)—OH$, wherein R represents a $C_{1-5}$ alkylene group and n represents an integer of 0 or more.

Hereinafter, a "positive electrode" and a "negative electrode" are collectively referred to as an "electrode". In addition, the "non-aqueous secondary battery of the second embodiment" is also simply referred to as a "battery".

Since the insulating layer in the battery of the second embodiment is a single layer, (1) there is no boundary between layers inside an insulating layer, whereby the discharge characteristics and the coulombic efficiency of the insulating layer can be enhanced, and (2) delamination does not occur inside the insulating layer, whereby the electrical resistance of the insulating layer can be suppressed to be low and the coulomb efficiency and the cell strength of the battery can be enhanced.

In the battery of the second embodiment, the insulating layer contains a PVDF resin (1). When the polyvinylidene fluoride type resin, the styrene-butadiene copolymer, or the like is used as the binder resin of the electrode active material layer, the PVDF resin (1) is the polyvinylidene fluoride type resin, and thus, exhibits affinity for the polyvinylidene fluoride type resin of the electrode active material layer, and has a site derived from the monomers represented by Formula (1), and thus, exhibits affinity for the styrene-butadiene copolymer of the electrode active material layer. The insulating layer containing the resin having high affinity for the binder resin of the electrode active material layer adheres well to the electrode, thereby increasing the coulombic efficiency and cell strength of the battery.

In addition, when the laminate of the electrode and the insulating layer is hot-pressed during the manufacture of the battery, the insulating layer containing the resin having the high affinity for the binder resin of the electrode active material layer adheres well to the electrode even when the hot press are performed under relatively mild conditions for the temperature and pressure. Therefore, the insulating layer containing the resin having the high affinity for the binder resin of the electrode active material layer maintains the ion permeability without blocking the pores of the insulating layer during the manufacture of the battery, and as a result, the discharge characteristics of the battery are enhanced.

By the synergistic action of each configuration described above, the non-aqueous secondary battery of the second embodiment is excellent in the discharge characteristics, the coulombic efficiency, and the cell strength, whereby the non-aqueous secondary battery has high reliability.

Hereinafter, the configuration of the non-aqueous secondary battery of the second embodiment will be described in detail.

[Positive Electrode of Second Embodiment]

The positive electrode of the second embodiment is synonymous with the positive electrode of the first embodiment. The matters described in the "positive electrode of the first embodiment" are applicable to the positive electrode of the second embodiment.

[Negative Electrode of Second Embodiment]

The negative electrode of the second embodiment is synonymous with the negative electrode of the first embodiment. The matters described in the "negative electrode of the first embodiment" are applicable to the negative electrode of the second embodiment.

[Insulating Layer of Second Embodiment]

The insulating layer of the second embodiment is synonymous with the insulating layer of the first embodiment, and is the same as the example of the embodiment.

The insulating layer of the second embodiment contains the PVDF resin (1) and the inorganic particles. The insulating layer may contain resins other than the PVDF resin (1), an organic filler, or the like.

—PVDF Resin (1)—

The insulating layer of the second embodiment contains a PVDF resin (1). The PVDF resin (1) contains, as polymerizing components, at least vinylidene fluoride (hereinafter, also referred to as "VDF") and a monomer represented by the following formula (1).

Formula (1)

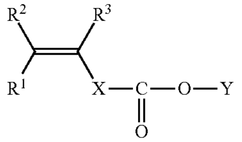

wherein, in Formula (1), each of $R^1$, $R^2$, and $R^3$ independently represents a hydrogen atom, a halogen atom, a $C_{1-5}$ alkyl group, a carboxyl group or a derivative of a carboxyl group; X represents a single bond, a $C_{1-5}$ alkylene group, or a substituted $C_{1-5}$ alkylene group; and Y represents a hydrogen atom, a $C_{1-5}$ alkyl group, a $C_{1-5}$ alkyl group that contains at least one hydroxy group, a $C_{1-5}$ alkyl group that contains at least one carboxyl group, or $—R—O—C(=O)—(CH_2)_n—C(=O)—OH$, wherein R represents a $C_{1-5}$ alkylene group and n represents an integer of 0 or more.

In Formula (1), a halogen atom represented by $R^1$, $R^2$, and $R^3$ may be any of a fluorine atom, a chlorine atom, a bromine atom, and an iodine atom, and is preferably the fluorine atom.

In Formula (1), examples of the alkyl group having 1 to 5 carbon atoms represented by $R^1$, $R^2$, and $R^3$ include a methyl group, an ethyl group, an n-propyl group, an n-butyl group, and an n-pentyl group which are linear alkyl groups; and an isopropyl group, an isobutyl group, a sec-butyl group, a tert-butyl group, an isopentyl group, a neopentyl group, and a tert-pentyl group which are branched alkyl groups. The alkyl group having 1 to 5 carbon atoms in $R^1$, $R^2$, and $R^3$ is preferably an alkyl group having 1 to 4 carbon atoms, and more preferably an alkyl group having 1 to 3 carbon atoms.

In the Formula (1), examples of the derivative of the carboxyl group represented by $R^1$, $R^2$, and $R^3$ include $—C(=O)—OR^4$ ($R^4$ represents an alkyl group.). Examples of $R^4$ include a methyl group, an ethyl group, an n-propyl group, an n-butyl group, and an n-pentyl group which are linear alkyl groups; and an isopropyl group, an isobutyl group, a sec-butyl group, a tert-butyl group, an isopentyl group, a neopentyl group, and a tert-pentyl group which are branched alkyl groups. $R^4$ is preferably an alkyl group having 1 to 5 carbon atoms, more preferably an alkyl group having 1 to 4 carbon atoms, and still more preferably an alkyl group having 1 to 3 carbon atoms.

In the Formula (1), examples of the alkylene group having 1 to 5 carbon atoms represented by X include a methylene group, an ethylene group, an n-propylene group, an n-butylene group, and an n-pentylene group which are linear alkylene groups; and an isopropylene group, an isobutylene group, a sec-butylene group, a tert-butylene group, an isopentylene group, a neopentylene group, and a tert-pentylene group which are branched alkylene groups. The alkylene group having 1 to 5 carbon atoms in X is preferably an alkylene group having 1 to 4 carbon atoms, and more preferably an alkylene group having 1 to 3 carbon atoms.

In the Formula (1), examples of the substituent in the alkylene group having 1 to 5 carbon atoms having a substituent represented by X include a halogen atom, and may be any of a fluorine atom, a chlorine atom, a bromine atom, and an iodine atom. Examples of the substituted alkylene group having 1 to 5 carbon atoms in X include a methylene group, an ethylene group, an n-propylene group, an n-butylene group, and an n-pentylene group which are linear alkylene groups; and an isopropylene group, an isobutylene group, a sec-butylene group, a tert-butylene group, an isopentylene group, a neopentylene group, and a tert-pentylene group which are branched alkylene groups. The alkylene group having 1 to 5 carbon atoms substituted in X is preferably an alkylene group having 1 to 4 carbon atoms, and more preferably an alkylene group having 1 to 3 carbon atoms.

In the Formula (1), examples of the alkyl group having 1 to 5 carbon atoms represented by Y include a methyl group, an ethyl group, an n-propyl group, an n-butyl group, and an n-pentyl group which are linear alkyl groups; and an isopropyl group, an isobutyl group, a sec-butyl group, a tert-butyl group, an isopentyl group, a neopentyl group, and a tert-pentyl group which are branched alkyl groups. The alkyl group having 1 to 5 carbon atoms in Y is preferably an alkyl group having 1 to 4 carbon atoms, and more preferably an alkyl group having 1 to 3 carbon atoms.

In the Formula (1), examples of the substituted alkyl group having 1 to 5 carbon atoms in the alkyl group having 1 to 5 carbon atoms substituted with at least one hydroxy group represented by Y include a methyl group, an ethyl group, an n-propyl group, an n-butyl group, and an n-pentyl group which are linear alkyl groups; and an isopropyl group, an isobutyl group, a sec-butyl group, a tert-butyl group, an isopentyl group, a neopentyl group, and a tert-pentyl group which are branched alkyl groups. As the substituted alkyl group having 1 to 5 carbon atoms in Y, an alkyl group having 1 to 4 carbon atoms is preferable, and an alkyl group having 1 to 3 carbon atoms is more preferable. The number of substitutions of the hydroxy group is preferably one or two, and more preferably one.

In Formula (1), examples of the alkyl group having 1 to 5 carbon atoms substituted with at least one hydroxy group represented by Y include a 2-hydroxyethyl group, a 2-hydroxypropyl group, and a 4-hydroxybutyl group.

In Formula (1), examples of the substituted alkyl group having 1 to 5 carbon atoms in the alkyl group having 1 to 5 carbon atoms substituted with at least one carboxyl group represented by Y include a methyl group, an ethyl group, an n-propyl group, an n-butyl group, and an n-pentyl group which are linear alkyl groups; and an isopropyl group, an isobutyl group, a sec-butyl group, a tert-butyl group, an isopentyl group, a neopentyl group, and a tert-pentyl group which are branched alkyl groups. As the substituted alkyl group having 1 to 5 carbon atoms in Y, an alkyl group having 1 to 4 carbon atoms is preferable, and an alkyl group having 1 to 3 carbon atoms is more preferable. The number of substitutions of the carboxyl group is preferably one or two, and more preferably one.

In Formula (1), examples of the alkyl group having 1 to 5 carbon atoms substituted with at least one carboxyl group represented by Y include a 2-carboxyl group, a 2-carboxypropyl group, and a 4-carboxybutyl group.

In Formula (1), in $-R-O-C(=O)-(CH_2)_n-C(=O)-OH$ represented by Y, R represents an alkylene group having 1 to 5 carbon atoms, and n represents an integer of 0 or more.

Examples of R include a methylene group, an ethylene group, an n-propylene group, an n-butylene group, and an n-pentylene group which are linear alkylene groups; and an isopropylene group, an isobutylene group, a sec-butylene group, a tert-butylene group, an isopentylene group, a neopentylene group, and a tert-pentylene group which are branched alkylene groups. R is preferably an alkylene group having 1 to 4 carbon atoms, and more preferably an alkylene group having 1 to 3 carbon atoms.

n is preferably an integer of 0 to 5, more preferably an integer of 1 to 4, and still more preferably 2 or 3.

Specific examples of the group include $-(CH_2)_2-O-C(=O)-(CH_2)_2-C(=O)-OH$.

Examples of the monomers represented by Formula (1) include monomers in which $R^1$, $R^2$, and $R^3$ are each independently a hydrogen atom or an alkyl group having 1 to 4 carbon atoms, and X is a single bond, and monomers in which Y is an alkyl group having 1 to 4 carbon atoms or an alkyl group having 1 to 3 carbon atoms substituted with at least one hydroxy group.

Examples of the monomers represented by Formula (1) include acrylic monomer, unsaturated dibasic acid, monoester of unsaturated dibasic acid, and the like.

Examples of the acrylic monomers include (meth)acrylic acid, (meth)methyl acrylate, ethyl (meth)acrylate, isopropyl (meth)acrylate, n-Butyl (meth)acrylate, isobutyl (meth)acrylate, tert-butyl (meth)acrylate, pentyl (meth)acrylate, 2-hydroxyethyl (meth)acrylate, 2-hydroxypropyl (meth)acrylate, 4-hydroxybutyl (meth)acrylate, 2-carboxyethyl (meth)acrylate, 2-carboxypropyl (meth)acrylate, 4-carboxybutyl (meth)acrylate, butenoic acid, pentenoic acid, hexenoic acid, (meth)acryloyloxyethyl succinate, and the like. In the disclosure, the notation "(meth) acryl" means either "acryl" or "methacryl".

Examples of the unsaturated dibasic acid include unsaturated dicarboxylic acid, and more specific examples of the unsaturated dibasic acid include maleic acid, maleic anhydride, citraconic acid, itaconic acid, and the like.

Examples of the monoester of the unsaturated dibasic acid include maleic acid monomethyl ester, maleic acid monoethyl ester, citraconic monomethyl ester, citraconic monoethyl ester, itaconic monomethyl ester, itaconic acid monoethyl ester, and the like, and among them, maleic acid monomethyl ester, and citraconic acid monomethyl ester are preferable.

In the PVDF resin (1), the ratio of the monomers represented by Formula (1) in all the polymerization components is preferably 0.1 mol % or more, more preferably 0.2 mol % or more, and still more preferably 0.5 mol % or more from the viewpoint of the affinity for the resin contained in the electrode active material layer.

In the PVDF resin (1), the ratio of the monomers represented by Formula (1) in all the polymerization components is preferably 5.0 mol % or less, more preferably 4.0 mol % or less, and still more preferably 3.0 mol % or less from the viewpoint of the low influence on the electrode active material.

The PVDF resin (1) may contain monomers other than VDF and the monomers represented by Formula (1) in the polymerization component. Examples of other monomers include halogen-containing monomers such as hexafluoropropylene, tetrafluoroethylene, trifluoroethylene, chlorotrifluoroethylene, vinyl fluoride, trichloroethylene, and the like.

The PVDF resin (1) is preferably a resin containing hexafluoropropylene (also referred to as HFP) as a polymerization component. The PVDF resin (1) can control the crystallinity of the resin, the adhesion to the electrode active material layer, the resistance to dissolution in the electrolytic solution, and the like to be within an appropriate range by increasing or decreasing the ratio of the HFP contained in all the polymerization components.

In the PVDF resin (1), the ratio of the HFP in all the polymerization components is preferably more than 2.0 mol %, more preferably more than 3.5 mol %, still more preferably 4.0 mol % or more, still more preferably 4.5 mol % or more, preferably 7.0 mol % or less, more preferably 6.5 mol % or less, and still more preferably 6.0 mol % or less.

In the PVDF resin (1), the ratio of the VDF in all the polymerization components is preferably 70 mol % or more, more preferably 80 mol % or more, still more preferably 90 mol % or more, preferably 99 mol % or less, and more preferably 98 mol % or less.

The PVDF resin (1) is preferably a terpolymer composed of the VDF, the HFP, and the monomers represented by Formula (1). In the terpolymer, the ratio of the monomers represented by Formula (1) in all the polymerization components is preferably 0.1 mol % or more, more preferably 0.2 mol % or more, further preferably 0.3 mol % or more, preferably 5.0 mol % or less, more preferably 4.0 mol % or less, and further preferably 2.0 mol % or less, and further, the ratio of the HFP in all the polymerization components is preferably more than 2.0 mol %, more preferably more than 2.1 mol %, further preferably 2.2 mol % or more, further preferably 2.3 mol % or more, further preferably 7.0 mol % or less, more preferably 6.5 mol % or less, and further preferably 6.0 mol % or less.

As the terpolymer composed of the VDF, the HFP, and the monomers represented by Formula (1), a VDF-HFP-acrylic acid terpolymer is preferable. In the acrylic acid terpolymer, the ratio of acrylic acid in all the polymerization components is preferably 0.1 mol % or more, more preferably 0.2 mol % or more, further preferably 0.3 mol % or more, preferably 5.0 mol % or less, more preferably 4.0 mol % or less, and further preferably 2.0 mol % or less, and further, the ratio of the HFP occupied in all the polymerization components is preferably more than 2.0 mol %, more preferably more than 2.1 mol %, further preferably 2.2 mol % or more, further preferably 2.3 mol % or more, further preferably 7.0 mol % or less, more preferably 6.5 mol % or less, and further preferably 6.0 mol % or less.

The weight-average molecular weight (Mw) of the PVDF resin (1) is preferably 300,000 or more, more preferably 500,000 or more, and still more preferably 1 million or more from the viewpoint that the pores of the insulating layer are less likely to be blocked when heat is applied to the insulating layer during the manufacture of the battery.

The weight-average molecular weight (Mw) of the PVDF resin (1) is preferably 3 million or less, more preferably 2.5 million or less, and still more preferably 2.3 million or less, from the viewpoint that, when heat is applied to the insulating layer during the manufacture of the battery, the resin is moderately softened and the insulating layer and the electrode adhere well to each other.

The content ratio of the PVDF resin (1) in the insulating layer of the second embodiment is preferably 10% by mass to 50% by mass, more preferably 15% by mass to 50% by mass, and still more preferably 20% by mass to 50% by mass.

The content of the PVDF resin (1) contained in the insulating layer of the second embodiment is preferably 85% by mass to 100% by mass, more preferably 90% by mass to 100% by mass, and still more preferably 95% by mass to 100% by mass based on the total amount of all the resins contained in the insulating layer.

—Other Components of Second Embodiment—

The insulating layer of the second embodiment may contain other resins than the PVDF resin (1). As other resins of the second embodiment, the resins listed in the "other resins of the first embodiment" can be applied, and the preferred content in the insulating layer is also the same.

—Inorganic Particle of Second Embodiment—

The inorganic particles of the second embodiment are synonymous with the inorganic particles in the first embodiment. The matters described in the "inorganic particles in the first embodiment" are applicable to the inorganic particles of the second embodiment. In the second embodiment, the following content ratio of the inorganic particles occupied in the insulating layer is applied.

The content ratio of the inorganic particles in the insulating layer of the second embodiment is 50% by mass or more, preferably 55% by mass or more, and more preferably 65% by mass or more from the viewpoint of enhancing the electrical insulation property of the insulating layer, enhancing the porosity of the insulating layer to improve the ion permeability, and enhancing the discharge characteristics of the battery.

The content ratio of the inorganic particles in the insulating layer of the second embodiment is preferably less than 90% by mass, more preferably less than 88% by mass, and still more preferably less than 85% by mass from the viewpoint of enhancing the mechanical strength of the insulating layer, improving the adhesion between the insulating layer and the electrode, and enhancing the coulombic efficiency and the cell strength of the battery.

—Organic Filler of Second Embodiment—

The organic filler of the second embodiment is synonymous with the organic filler in the first embodiment. The matters described in the "organic filler in the first embodiment" are applicable to the organic filler of the second embodiment.

—Other Components of Second Embodiment—

Other components of the second embodiment are synonymous with the other components in the first embodiment.

[Characteristics of Insulating Layer of Second Embodiment]

The characteristics of the insulating layer of the second embodiment are similar to the matters described in the "characteristics of the insulating layer of the first embodiment".

[Electrolytic Solution of Second Embodiment]

The electrolytic solution of the second embodiment is synonymous with the electrolytic solution in the first embodiment. The matters described in the "electrolytic solution of the first embodiment" are applicable to the electrolytic solution of the second embodiment.

<<Non-Aqueous Secondary Battery of Third Embodiment>>

The non-aqueous secondary battery of the third embodiment contains a positive electrode, a negative electrode, an insulating layer and an electrolyte. The insulating layer contains a resin and inorganic particles, and a thickness of the insulating layer is from 5 μm to 30 μm. Further, the inorganic particles of the insulating layer include metal sulfate particles.

Hereinafter, a "positive electrode" and a "negative electrode" are collectively referred to as an "electrode". In addition, a "non-aqueous secondary battery of a third embodiment" is also simply referred to as a "battery".

Since the insulating layer in the battery of the third embodiment is a single layer, (1) there is no interlayer boundary inside the insulating layer, whereby the discharge characteristics and discharge capacity retention of the battery can be enhanced, and (2) the occurrence of the micro-short circuit can be suppressed while suppressing the electric resistance of the insulating layer to a low level, and further, the cell strength of the battery can be enhanced.

In the battery of the third embodiment, the thickness of the insulating layer is 5 μm or more from the viewpoint of the electrical insulation property and the mechanical strength of the insulating layer, and is 30 μm or less from the viewpoint of improving the ion permeability and improving the discharge characteristics of the battery.

In the battery of the third embodiment, the inorganic particles of the insulating layer include metal sulfate particles. The metal sulfate particles are stable with respect to the electrolytic solution and hardly generate gas. Therefore, the battery including the insulating layer in which some or all of the inorganic particles are metal sulfate particles is excellent in at least one of the discharge characteristics, the discharge capacity retention at a high temperature, and difficulty in generating the micro-short circuit, as compared with the battery including the insulating layer in which all of the inorganic particles are inorganic particles other than the metal sulfate particles.

By the synergistic action of the above configurations, the non-aqueous secondary battery according to the third embodiment has high reliability.

Hereinafter, the configuration including the non-aqueous secondary battery of the third embodiment will be described in detail.

[Positive Electrode of Third Embodiment]

The positive electrode of the third embodiment is synonymous with the positive electrode of the first embodiment. The matters described in the "positive electrode of the first embodiment" are applicable to the positive electrode of the third embodiment.

[Negative Electrode of Third Embodiment]

The negative electrode of the third embodiment is synonymous with the negative electrode of the first embodiment. The matters described in the "negative electrode of the first embodiment" are applicable to the negative electrode of the third embodiment.

[Insulating Layer of Third Embodiment]

The insulating layer of the third embodiment is synonymous with the insulating layer of the first embodiment, and is the same as the example of the embodiment.

The insulating layer of the third embodiment contains a resin and inorganic particles, and some or all of the inorganic particles are metal sulfate particles. The insulating layer may contain other inorganic particles, organic fillers, and the like other than the metal sulfate particles.

[Resin of Third Embodiment]

The resin contained in the insulating layer of the third embodiment is preferably a resin that is stable in an electrolytic solution, is electrochemically stable, has a function of connecting inorganic particles, and can adhere to an electrode. The insulating layer may contain only one type of resin or two or more types of resins.

A type of resin contained in the insulating layer of the third embodiment is not limited. Examples of the resin include a polyvinylidene fluoride type resin, an acrylic type resin, a fluorinated rubber, a styrene-butadiene copolymer or a homopolymer or a copolymer of vinyl nitrile compounds (acrylonitrile, methacrylonitrile, and the like), carboxymethyl cellulose, hydroxyalkyl cellulose, polyvinyl alcohol, polyvinyl butyral, polyvinyl pyrrolidone, polyethers (polyethylene oxide, polypropylene oxide, and the like), polyamide, wholly aromatic polyamide (also referred to as aramid), polyimide, polyamide imide, polysulfone, polyketone, polyether ketone, polyether sulfone, polyether imide, and mixtures thereof.

As the resin in the third embodiment, a polyvinylidene fluoride type resin is preferable from the viewpoint of the adhesiveness of the insulating layer to the electrode. Examples of the polyvinylidene fluoride type resin include a homopolymer (that is, polyvinylidene fluoride) of vinylidene fluoride; a copolymer of vinylidene fluoride and halogen-containing monomers such as hexafluoropropylene, tetrafluoroethylene, trifluoroethylene, chlorotrifluoroethylene, vinyl fluoride, and trichloroethylene; and mixtures thereof. The polyvinylidene fluoride type resin may be used singly, or may be used in combination of two or more thereof.

As the polyvinylidene fluoride type resin, it is preferably a copolymer of vinylidene fluoride (VDF) and hexafluoropropylene (HFP) (VDF-HFP copolymer) from the viewpoint of the adhesiveness of the insulating layer to the electrode. In the disclosure, the VDF-HFP copolymer includes both a copolymer obtained by polymerizing only the VDF and HFP (VDF-HFP binary copolymer) and a copolymer obtained by polymerizing the VDF, the HFP, and other monomers. Here, examples of other monomers include halogen-containing monomers such as tetrafluoroethylene, trifluoroethylene, chlorotrifluoroethylene, vinyl fluoride, and trichloroethylene.

The VDF-HFP copolymer can control the crystallinity of the copolymer, the adhesion to the electrode active material layer, the resistance to dissolution in the electrolytic solution, and the like to be within an appropriate range by increasing or decreasing the content of the HFP unit.

In a VDF-HFP copolymer, a ratio of HFP in all polymerization components is preferably more than 1.0 mol %, more preferably more than 1.5 mol %, still more preferably 2.0 mol % or more, still more preferably 2.2 mol % or more, preferably 7.0 mol % or less, more preferably 6.5 mol % or less, and still more preferably 6.0 mol % or less.

The weight-average molecular weight (Mw) of the polyvinylidene fluoride type resin contained in the insulating layer of the third embodiment is preferably 900,000 or more and 1.5 million or less.

When the Mw of the polyvinylidene fluoride type resin is 900,000 or more, the electrical insulation property of the insulating layer is preferable, and further, when heat is applied to the insulating layer during the manufacture of the battery, the pores of the insulating layer are less likely to be blocked. From this viewpoint, the Mw of the polyvinylidene fluoride type resin is preferably 900,000 or more, more preferably 1 million or more, and still more preferably 1.1 million or more.

When the Mw of the polyvinylidene fluoride type resin is 1.5 million or less, the insulating layer and the electrode adhere well when heat is applied to the insulating layer during the manufacture of the battery, and a gap is hardly generated between the insulating layer and the electrode. From this viewpoint, the Mw of the polyvinylidene fluoride type resin is preferably 1.5 million or more, more preferably 1.4 million or more, and still more preferably 1.3 million or more.

The content ratio of the polyvinylidene fluoride type resin in the insulating layer of the third embodiment is preferably 10% by mass to 50% by mass, more preferably 15% by mass to 50% by mass, and still more preferably 20% by mass to 50% by mass.

The content of the polyvinylidene fluoride type resin contained in the insulating layer of the third embodiment is preferably 85% by mass to 100% by mass, more preferably 90% by mass to 100% by mass, and still more preferably 95% by mass to 100% by mass based on the total amount of all the resins contained in the insulating layer.

The content of other resins other than the polyvinylidene fluoride type resin contained in the insulating layer of the third embodiment is preferably 0% by mass to 15% by mass, more preferably 0% by mass to 10% by mass, and still more preferably 0% by mass to 5% by mass based on the total amount of all the resins contained in the insulating layer.

—Inorganic Particles of Third Embodiment—

The particle shape of the inorganic particles of the third embodiment is not limited, and may be any of a spherical shape, a plate shape, a needle shape, and an amorphous shape. The inorganic particles are preferably spherical or plate-shaped particles from the viewpoint of suppressing a short circuit of the battery or from the viewpoint of easily filling the insulating layer densely.

At least a part of the inorganic particles of the third embodiment are the metal sulfate particles. The inorganic particles may contain inorganic particles other than the metal sulfate particles. Examples of inorganic particles other than the metal sulfate particles include metal hydroxide particles, metal oxide particles, metal carbonate particles, metal nitride particles, metal fluoride particles, clay mineral particles, and the like. The inorganic particles may be used singly or in combination of two or more kinds thereof.

Each of the particles of the metal sulfate particles, the metal hydroxide particles, the metal oxide particles, the metal carbonate particles, the metal nitride particles, the metal fluoride particles, and the clay mineral of the third embodiment have the same meaning as the particles of the metal sulfate particles, the metal hydroxide particles, the metal oxide particles, the metal carbonate particles, the metal nitride particles, the metal fluoride particles, and the clay mineral in the "inorganic particles of the first embodiment", and preferred embodiments thereof are also the same.

The content of the metal sulfate particles contained in the insulating layer of the third embodiment is preferably 85% by mass to 100% by mass, more preferably 90% by mass to 100% by mass, and still more preferably 95% by mass to 100% by mass based on the total amount of all the inorganic particles contained in the insulating layer.

The content of inorganic particles other than the metal sulfate particles contained in the insulating layer of the third embodiment is preferably 0% by mass to 15% by mass, more preferably 0% by mass to 10% by mass, and still more preferably 0% by mass to 5% by mass based on the total amount of all the inorganic particles contained in the insulating layer.

The average primary particle size of the metal sulfate particles contained in the insulating layer of the third embodiment is preferably 0.01 μm or more, more preferably 0.02 μm or more, and still more preferably 0.03 μm or more from the viewpoint of making the insulating layer porous to increase the ion permeability.

The average primary particle size of the metal sulfate particles contained in the insulating layer of the third embodiment is preferably 1.00 μm or less, more preferably 0.50 μm or less, still more preferably 0.30 μm or less from the viewpoint of thinning the insulating layer to increase the energy density of the battery and increasing the filling degree of the metal sulfate particles in the insulating layer to increase the strength of the insulating layer.

The method of obtaining an average primary particle size of inorganic particles of the third embodiment is the same as the method of obtaining an average primary particle size of inorganic particles of the first embodiment.

The content ratio of the inorganic particles in the insulating layer of the third embodiment is 50% by mass or more, preferably 55% by mass or more, and more preferably 60% by mass or more from the viewpoint of enhancing the electrical insulation property of the insulating layer, enhancing the porosity of the insulating layer to improve the ion permeability, and enhancing the discharge characteristics of the battery.

The content ratio of the inorganic particles occupied in the insulating layer of the third embodiment is preferably less than 90% by mass, more preferably less than 88% by mass, and still more preferably less than 85% by mass from the viewpoint of improving the adhesion between the insulating layer and the electrode and enhancing the coulombic efficiency and the cell strength of the battery.

—Organic Filler of Third Embodiment—

The organic filler of the third embodiment is synonymous with the organic filler in the first embodiment. The matters described in the "organic filler in the first embodiment" are applicable to the organic filler of the third embodiment.

—Other Components of Third Embodiment—

Other components of the third embodiment are synonymous with the other components in the first embodiment.

[Characteristics of Insulating Layer of Third Embodiment]

The characteristics of the insulating layer of the third embodiment are similar to the matters described in the "characteristics of the insulating layer of the first embodiment".

[Electrolytic Solution of Third Embodiment]

The electrolytic solution of the third embodiment is synonymous with the electrolytic solution in the first embodiment. The matters described in the "electrolytic solution of the first embodiment" are applicable to the electrolytic solution of the third embodiment.

FIG. 1 is an example of an embodiment of a non-aqueous secondary battery of the disclosure. FIG. 1 is a diagram schematically illustrating a cross section of a battery. FIG. 1 is an example of an embodiment of a non-aqueous secondary battery, and does not limit the embodiment.

A non-aqueous secondary battery 100 illustrated in FIG. 1 includes a battery element 10, an electrolytic solution 50, and an exterior material 90. The battery element 10 and the electrolytic solution 50 are accommodated in the exterior material 90.

The battery element 10 includes a positive electrode 20, an insulating layer 30, and a negative electrode 40. The battery element 10 has a structure in which at least one positive electrode 20, at least one insulating layer 30, and at least one negative electrode 40 are layered in this order.

The positive electrode 20 includes a positive electrode current collector 22 and positive electrode active material layers 24 disposed on both sides of the positive electrode current collector 22. One end of the positive electrode current collector 22 is not provided with the positive electrode active material layer 24 and has, for example, a tab shape.

The negative electrode 40 includes a negative electrode current collector 42 and negative electrode active material layers 44 disposed on both sides of the negative electrode current collector 42. One end of the negative electrode current collector 42 is not provided with the negative electrode active material layer 44 and has, for example, a tab shape.

One surface of the insulating layer 30 is in contact with the positive electrode active material layer 24, and the other surface thereof is in contact with the negative electrode active material layer 44. The insulating layer 30 is a porous layer, and the insulating layer 30 is impregnated with the electrolytic solution 50.

Examples of the exterior material 90 include a metal can, an aluminum laminate film pack, and the like.

The non-aqueous secondary battery 100 includes a positive electrode terminal (not illustrated) and a negative electrode terminal (not illustrated) outside the exterior material 90. A plurality of positive electrode current collectors 22 are connected to the positive electrode terminal, and a plurality of negative electrode current collectors 42 are connected to the negative electrode terminal. A lead tab may be interposed between the positive electrode terminal and the positive electrode current collector 22 (alternatively, a space between the negative electrode terminal and the negative electrode current collector 42).

Examples of the shape of the non-aqueous secondary battery 100 include a square shape, a cylindrical shape, a coin shape, and the like.

[Method of Manufacturing Non-Aqueous Secondary Battery]

The non-aqueous secondary battery of the disclosure can be manufactured, for example, by the following manufacturing method. That is, the manufacturing method includes a step A of forming an insulating layer on a support by a wet coating method or a dry coating method; a step B of manufacturing a laminate in which an insulating layer is disposed between a positive electrode and a negative electrode; and a step C of performing wet heat press and/or dry heat press on the laminate.

—Step A—

The support means a sheet-like material to which a coating liquid for forming an insulating layer is applied. Examples of the support include a positive electrode, a negative electrode, and a release sheet.

The wet coating method means a method of solidifying a coating layer in a coagulation liquid, and the dry coating method means a method of drying and solidifying a coating layer.

Examples of the embodiment of the step A include a step of forming an insulating layer on a positive electrode active material layer by a wet coating method or a dry coating method; a step of forming an insulating layer on a negative electrode active material layer by a wet coating method or a dry coating method; a step of forming an insulating layer on a release sheet by a wet coating method or a dry coating method.

Hereinafter, an embodiment in which the insulating layer is formed on the support by the wet coating method will be described.

Exemplary embodiments of the wet coating method include an embodiment of applying a coating liquid containing a resin and inorganic particles onto a support, immersing the resulting product in a coagulation liquid to solidify the coating layer, pulling the resulting product out of the coagulation liquid, washing the resulting product with water, and drying the resulting product.

The coating liquid for forming the insulating layer is prepared by dissolving or dispersing a resin and inorganic particles in a solvent. In the coating liquid, a component other than the resin and the inorganic particles is dissolved or dispersed, if necessary.

A solvent used for preparing the coating liquid includes a solvent that dissolves the resin (hereinafter, also referred to as "good solvent"). Examples of the good solvent include a polar amide solvent such as N-methylpyrrolidone, dimethylacetamide, or dimethylformamide.

The solvent used for preparing the coating liquid preferably contains a phase separation agent that induces phase separation from the viewpoint of forming an insulating layer having a favorable porous structure. Therefore, the solvent used for preparing the coating liquid is preferably a mixed solvent of a good solvent and a phase separation agent. The phase separation agent is preferably mixed with a good solvent in such an amount that a viscosity suitable for coating can be ensured. Examples of the phase separation agent include water, methanol, ethanol, propyl alcohol, butyl alcohol, butanediol, ethylene glycol, propylene glycol, and tripropylene glycol.

The solvent used for preparing the coating liquid is preferably a mixed solvent of a good solvent and a phase separation agent, containing 60% by mass or more of the good solvent and from 5% by mass to 40% by mass of the phase separation agent from the viewpoint of forming an insulating layer having a favorable porous structure.

The resin concentration of the coating liquid is preferably from 3% by mass to 10% by mass from the viewpoint of forming an insulating layer having a favorable porous structure. The inorganic particles concentration of the coating liquid is preferably from 2% by mass to 50% by mass from the viewpoint of forming an insulating layer having a favorable porous structure.

The coating liquid may contain a dispersant such as a surfactant, a wetting agent, an antifoaming agent, or a pH adjuster. These additives may be those remain in the heat-resistant porous layer as long as the additives are electrochemically stable in the range of use of a non-aqueous secondary battery and do not inhibit the reaction in the battery.

Examples of a means of applying the coating liquid to the support include a Meyer bar, a die coater, a reverse roll coater, a roll coater, a gravure coater, and a knife coater.

The coating layer is solidified by immersing the support on which the coating layer is formed in a coagulation liquid, and solidifying the resin while phase separation is induced in the coating layer. As a result, a composite body composed of the insulating layer on the support is obtained.

The coagulation liquid generally contains the good solvent and the phase separation agent used for preparing the coating liquid, and water. A mixing ratio between the good solvent and the phase separation agent is preferably matched with the mixing ratio of the mixed solvent used for preparing the coating liquid in terms of production. The content of water in the coagulation liquid is preferably from 40% by mass to 90% by mass from viewpoints of formation of a porous structure of the insulating layer and productivity. The temperature of the coagulation liquid is, for example, from 20° C. to 50° C.

After the coating layer is solidified in the coagulation liquid, the composite body is pulled out of the coagulation liquid and washed with water. By washing the composite body with water, the coagulation liquid is removed from the composite body. Furthermore, by drying the composite body, water is removed from the composite body. Washing with water is performed, for example, by transporting the composite body in a water washing bath. Drying is performed, for example, by transporting the composite body in a high-temperature environment, blowing air to the composite body, or bringing the composite body into contact with a heat roll. The drying temperature is preferably from 40° C. to 80° C. From the viewpoint of removing water from the insulating layer as much as possible, so as not the water in the insulating layer to contact to the electrolyte, vacuum drying is preferably performed under high temperature (for example, from 80° C. to 100° C.).

The insulating layer can also be produced by a dry coating method. Exemplary embodiments of the dry coating method include an embodiment of applying a coating liquid onto a support, drying the coating layer to remove a solvent by evaporation, and thereby forming an insulating layer on the support.

—Step B—

Examples of the embodiment of the step B include an embodiment in which a positive electrode and a negative electrode in which an insulating layer is formed on a negative electrode active material layer are layered one on another; an embodiment in which a negative electrode and a positive electrode with an insulating layer formed on a positive electrode active material layer are layered one on another; an embodiment in which a positive electrode, an insulating layer peeled from a peeling sheet, and a negative electrode are layered one on another; and the like.

The method of disposing an insulating layer between a positive electrode and a negative electrode may be a method (so-called stacking method) of layering at least one layer of a positive electrode, an insulating layer, and a negative electrode in this order, or may be a method of layering a positive electrode, an insulating layer, a negative electrode, and an insulating layer in this order and winding them in a longitudinal direction.

—Step C—

The wet heat press means that the insulating layer is impregnated with the electrolytic solution and subjected to heat press treatment, and the dry heat press means that the coating layer is subjected to the heat press treatment without impregnating the electrolytic solution.

Examples of the embodiment of the step C include the following (1) to (3).

(1) The laminate is accommodated in the exterior material (for example, a pack made of an aluminum laminate film. Same as below), and the electrolytic solution is injected into the exterior material, the inside of the exterior material is brought into a vacuum state, and then the laminate is wet heat-pressed from above the exterior material, thereby performing the bonding of the electrode and the insulating layer and the sealing of the exterior material.

(2) After the electrode and the insulating layer are bonded to each other by performing the dry heat press on the laminate, the laminate is accommodated in the exterior material, the electrolytic solution is injected into the exterior material, the inside of the exterior material is brought into the vacuum state, and then the exterior material is sealed.

(3) After the electrode and the insulating layer are bonded to each other by performing the dry heat press on the laminate, the laminate is accommodated in the exterior material, the electrolytic solution is injected into the exterior material, the inside of the exterior material is brought into the vacuum state, and then the laminate is further wet heat-pressed from above the exterior material, thereby performing the bonding of the electrode and the insulating layer and the sealing of the exterior member.

As conditions for the hot press in the manufacturing methods (1) to (3), the press pressure is preferably 0.1 MPa to 10.0 MPa and the temperature is preferably 60° C. to 100° C. for each of the dry heat press and the wet heat press.

EXAMPLES

Hereinafter, the non-aqueous secondary battery of the disclosure will be described more specifically with reference to Examples. Materials, used amounts, ratios, treatment procedures, and the like illustrated in the following Examples can be changed, if appropriate without departing from the spirit of the disclosure. Therefore, the range of the non-aqueous secondary battery of the disclosure should not be construed as being limited by the specific examples described below.

<Measurement Method and Evaluation Method>

The measurement methods and evaluation methods applied in the examples of the invention and comparative examples are as follows.

[Thickness of Insulating Layer]

The thickness (μm) of the electrode and the thickness (μm) of the composite in which the insulating layer is disposed on the electrode were obtained by measuring 20 points in a rectangle of 5 cm×3 cm using a contact type thickness meter (Mitutoyo Corporation, LITEMATIC VL-50) and averaging the measured 20 points. The measurement terminal used was a cylindrical terminal with a diameter of 5 mm, and was adjusted so that a load of 0.01 N was applied during the measurement. Then, a value obtained by subtracting the thickness of the electrode from the thickness of the composite was taken as the thickness (μm) of the insulating layer.

[Mass Per Unit Area of Insulating Layer]

The electrode and the composite having the insulating layer disposed on the electrode were each cut into a rectangle of 5 cm×3 cm, the mass (g) was each measured, and the mass was divided by the area (0.0015 $m^2$) to determine the mass ($g/m^2$) per unit area. Then, a value obtained by subtracting the mass per unit area of the electrode from the mass per unit area of the composite was taken as the mass per unit area ($g/m^2$) of the insulating layer.

[Porosity of Insulating Layer]

The porosity ε (%) of the insulating layer was obtained by the method described above.

[Average Primary Particle Size of Inorganic Particle]

The average primary particle size of the inorganic particles was obtained by observing the major diameters of 100 primary particles randomly selected in observation with a scanning electron microscope (SEM) using a sample of inorganic particles before the inorganic particles were added to the coating liquid for forming the insulating layer and averaging the major diameters of 100 primary particles.

[Weight-Average Molecular Weight of Polyvinylidene Fluoride Type Resin]

The weight-average molecular weight (Mw) of the polyvinylidene fluoride type resin was measured by gel permeation chromatography (GPC). The molecular weight was measured by GPC using a GPC device "GPC-900" manufactured by JASCO Corporation, using two columns of TSKgel SUPER AWM-H manufactured by Tosoh Corporation, using N, N-dimethylformamide for a solvent, under conditions that temperature was 40° C. and a flow rate was 0.6 mL/min to obtain a molecular weight in terms of polystyrene.

[Ratio of Monomers Constituting Polyvinylidene Fluoride Type Resin]

10 mg of polyvinylidene fluoride type resin was dissolved in 0.6 mL of heavy dimethyl sulfoxide at 100° C., a $^{19}$F-NMR spectra were measured at 100° C., and $^{1}$H-NMR spectra were measured at room temperature. The ratio of the monomers constituting the polyvinylidene fluoride type resin was obtained from the ratio of the peak intensities derived from the monomers in the NMR spectrum.

[Discharge Characteristics]

The battery was subjected to five cycles of charge and discharge of the following (a), and then subjected to one cycle of charge and discharge of the following (b).

(a) Constant current constant voltage charge at 4 mA/4.2 V for 15 hours and constant current discharge at 4 mA/2.5 V cut-off (b) Constant current constant voltage charge at 8 mA/4.2 V for 8 hours and constant current discharge at 200 mA/2.5 V cut-off The discharge capacity in the above (b) was divided by the discharge capacity at a fifth cycle in the above (a), and the obtained value was taken as the discharge characteristics of the battery. Using the discharge characteristics of Reference Example 1 as a reference value, the percentage of each of the discharge characteristics of Examples and Comparative Examples with respect to Reference Example 1 was calculated and classified as follows.

A: 95% or more
B: From 85% to less than 95%
C: From 70% to less than 85%
D: less than 70%

[Coulombic Efficiency]

The discharge capacity at a first cycle in the above (a) was divided by the charge capacity, and the obtained value was taken as the coulombic efficiency of the battery. Using the coulombic efficiency of Reference Example 1 as a reference value, the percentage of each of the coulombic efficiency of Examples and Comparative Examples with respect to Reference Example 1 was calculated and classified as follows.

A: 95% or more
B: From 85% to less than 95%
C: From 70% to less than 85%
D: less than 70%

[Cell Strength]

The battery was subjected to a 3-point bending test in accordance with ISO 178 to determine the maximum load (N) when the battery was broken. Using the maximum load of Reference Example 1 as a reference value, the percentage of each of the maximum loads of Examples and Comparative Examples with respect to Reference Example 1 was calculated and classified as follows.

A: 90% or more
B: less than 90%

[Discharge Capacity Retention Ratio]

The battery after the evaluation of the discharge characteristics was disposed in the environment at a temperature of 85° C. for 7 days. Next, after returning to the environment at a temperature of 25° C., the charge and discharge in (a) described above was performed for one cycle.

The discharge capacity after storage at a temperature of 85° C. was divided by the discharge capacity at the fifth cycle in the (a) before storage, and the obtained value was taken as the discharge capacity retention ratio of the battery. Using the discharge capacity retention ratio of Reference Example 1 as a reference value, the percentage of each of the discharge capacity retention ratios of Examples and Comparative Examples with respect to Reference Example 1 was calculated and classified as follows.

A: 95% or more
B: less than 95%

[Micro-Short Circuit]

The charge and discharge in the (a) were performed on 60 batteries for 5 cycles. The discharge capacity in each cycle was divided by the charge capacity for each battery, and the obtained value (%) was taken as the coulombic efficiency. A battery having a coulombic efficiency of 90% or more in all cycles was determined to be acceptable, and a battery not corresponding thereto was determined to be unacceptable. Using the number of batteries that were accepted in Reference Example 1 as a reference value, the percentage of each of the number of batteries that were accepted in Examples and Comparative Examples with respect to Reference Example 1 was calculated and classified as follows.

A: 95% or more
B: less than 95%

<<Manufacture of Non-Aqueous Secondary Battery of First Embodiment>>

Example 1

—Manufacture of Positive Electrode—

94 parts by mass of lithium cobaltate powder, 3 parts by mass of acetylene black, 3 parts by mass of polyvinylidene fluoride resin, and an appropriate amount of N-methyl-2-pyrrolidone were kneaded to prepare slurry. The slurry was applied onto an aluminum foil having a thickness of 20 dried, and then pressed to obtain a positive electrode (single-sided coating, basis weight 20.5 mg/cm$^2$, density of 2.95 g/cm$^3$).

—Manufacture of Negative Electrode—

96.2 parts by mass of graphite powder, 2.8 parts by mass of a modified product of a styrene-butadiene copolymer, 1.0 parts by mass of carboxymethyl cellulose, and an appropriate amount of water were kneaded to prepare a slurry. The slurry was applied onto a copper foil having a thickness of 15 μm, dried, and then pressed to obtain a negative electrode (single-sided coating, basis weight 10.0 mg/cm$^2$, density of 1.60 g/cm$^3$).

—Manufacture of Insulating Layer—

The VDF-HFP binary copolymer (weight-average molecular weight: 1.13 million, ratio of HFP in all polymerization components: 2.4 mol %) was dissolved in a mixed solvent (DMAc:TPG=80:20 [content ratio]) of dimethylacetamide (DMAc) and tripropylene glycol (TPG) so as to have a concentration of 5% by mass, and then the magnesium hydroxide particles (average primary particle size: 0.88 μm) were added and stirred and mixed, thereby obtaining a coating liquid (1). The content ratio (VDF-HFP binary copolymer:magnesium hydroxide particles) of the VDF-HFP binary copolymer and the magnesium hydroxide particles was 20:80.

The coating liquid (1) was applied onto the negative electrode active material layer using a knife coater, and the obtained product was immersed in a coagulation liquid (DMAc:water=50:50 [content ratio], liquid temperature 25° C.) for 5 minutes to solidify the coating layer, and then washed in a water washing tank having a water temperature of 25° C. The obtained product was taken out from the water washing tank, placed in a thermostatic tank at 70° C., dried for 15 minutes, and then dried under reduced pressure at 110° C. for 3 hours. In this way, a composite in which a single insulating layer was disposed on the negative electrode was obtained.

—Manufacture of Battery—

The positive electrode was cut into a size of 5.0 cm×3.0 cm, and the composite having the insulating layer disposed on the negative electrode was cut into a size of 5.2 cm×3.2 cm, and a lead tab was welded to each of the positive electrode and the composite. The positive electrode and the composite were layered one on another so that the positive electrode active material layer and the insulating layer were in contact with each other, thereby obtaining a laminate. The laminate was impregnated with an electrolytic solution and sealed in an exterior material of an aluminum laminate film. The electrode and the insulating layer were bonded by the hot press (85° C., 0.5 MPa, for 2 min) from above the exterior material, thereby obtaining a battery. As the electrolytic solution, 1 mol/L $LiPF_6$-ethylene carbonate:ethyl methyl carbonate (content ratio 3:7) was used. The battery had a set capacity of 40 mAh (range of from 4.2 V to 2.5 V).

Examples 2 to 8 and Comparative Examples 1 to 7

Each battery was manufactured in the same manner as in Example 1, except that the material, composition, and thickness of the insulating layer were specified as shown in Table 1.

In Examples 7 and 8, magnesium hydroxide particles and barium sulfate particles were used in combination at magnesium hydroxide particles:barium sulfate particles=50:50 (content ratio).

Reference Example 1

—Manufacture of 3-Layer Separator—

Using a reverse roll coater, the coating liquid (1) was applied to both sides of a polyethylene microporous film (thickness: 7 μm, porosity: 36%, Gurley value: 120 seconds/100 mL) in equal amounts. The obtained product was immersed in a coagulation liquid (DMAc:water=50:50 [content ratio], liquid temperature 40° C.) to solidify the coating layer, then washed in a water washing tank having a water temperature of 40° C., and dried. In this way, the separator in which the coating layer was formed on both surfaces of the polyethylene microporous film was obtained.

—Manufacture of Battery—

A positive electrode and a negative electrode in Example 1 were prepared. The positive electrode was cut into a size of 5.0 cm×3.0 cm, and the negative electrode was cut into a size of 5.2 cm×3.2 cm, and a lead tab was welded to each of the positive electrode and the negative electrode. The separator was cut into a size of 5.4 cm×3.4 cm.

The positive electrode, the separator, and the negative electrode were layered one on another in this order so that the electrode active material layer was in contact with the separator, thereby obtaining a laminate. The laminate was impregnated with an electrolytic solution (the same electrolytic solution as used in Example 1), and sealed in an exterior material of an aluminum laminate film. The electrode and the separator were bonded by the hot press (85° C., 0.5 MPa, for 2 min) from above the exterior material, thereby obtaining a battery.

The compositions, physical properties and evaluation results of the batteries of Examples 1 to 8, Comparative Examples 1 to 7 and Reference Example 1 are each shown in Table 1.

TABLE 1

| | Resin | | Inorganic Particle | | Composition | |
|---|---|---|---|---|---|---|
| | Kind — | Mw — | Kind — | Average Primary Particle Size μm | Resin % by mass | Inorganic Particle % by mass |
| Reference Example 1 | PVDF | 1.13 million | Mg $(OH)_2$ | 0.88 | 20 | 80 |
| Example 1 | PVDF | 1.13 million | Mg $(OH)_2$ | 0.88 | 20 | 80 |
| Example 2 | PVDF | 1.13 million | Mg $(OH)_2$ | 0.88 | 20 | 80 |
| Example 3 | PVDF | 1.13 million | Mg $(OH)_2$ | 0.88 | 40 | 60 |
| Comparative Example 1 | PVDF | 1.13 million | Mg $(OH)_2$ | 0.88 | 60 | 40 |
| Comparative Example 2 | PVDF | 1.13 million | Mg $(OH)_2$ | 0.88 | 10 | 90 |
| Comparative Example 3 | PVDF | 1.13 million | — | — | 100 | 0 |
| Comparative Example 4 | PVDF | 0.85 million | Mg $(OH)_2$ | 0.88 | 20 | 80 |
| Comparative Example 5 | PVDF | 3 million | Mg $(OH)_2$ | 0.88 | 20 | 80 |
| Comparative Example 6 | Aramid | 0.8 million | Mg $(OH)_2$ | 0.88 | 20 | 80 |
| Example 4 | PVDF | 1.13 million | $BaSO_4$ | 0.05 | 20 | 80 |
| Example 5 | PVDF | 1.13 million | $BaSO_4$ | 0.05 | 20 | 80 |
| Example 6 | PVDF | 1.13 million | $BaSO_4$ | 0.05 | 40 | 60 |
| Comparative Example 7 | PVDF | 3 million | $BaSO_4$ | 0.05 | 20 | 80 |
| Example 7 | PVDF | 1.13 million | Mg $(OH)_2$<br>$BaSO_4$ | 0.88<br>0.05 | 20 | 80 |

TABLE 1-continued

| | | | | | | |
|---|---|---|---|---|---|---|
| Example 8 | PVDF | 1.13 million | $Mg(OH)_2$<br>$BaSO_4$ | 0.88<br>0.05 | 40 | 60 |

| | Insulating Layer | | | Performance of Battery | | |
|---|---|---|---|---|---|---|
| | Thickness µm | Mass per Unit Area g/$m^2$ | Porosity % | Discharge Characteristic — | Coulombic Efficiency — | Cell Strength — |
| Reference Example 1 | Single Side of Coating Layer 1.1 | Single Side of Coating Layer 1.05 | Coating Layer 57 | — | — | — |
| Example 1 | 10.6 | 9.90 | 58 | A | A | A |
| Example 2 | 50.0 | 55.00 | 50 | C | A | A |
| Example 3 | 9.8 | 8.60 | 58 | B | A | A |
| Comparative Example 1 | 6.6 | 8.00 | 39 | C | C | A |
| Comparative Example 2 | 8.8 | 9.20 | 54 | B | D | B |
| Comparative Example 3 | 6.0 | 7.00 | 34 | D | D | A |
| Comparative Example 4 | 9.2 | 9.40 | 54 | D | D | A |
| Comparative Example 5 | 7.7 | 8.30 | 51 | D | D | B |
| Comparative Example 6 | 7.0 | 3.30 | 77 | D | D | B |
| Example 4 | 8.7 | 17.77 | 41 | A | A | A |
| Example 5 | 20.2 | 30.34 | 56 | B | A | A |
| Example 6 | 7.6 | 12.51 | 41 | B | A | A |
| Comparative Example 7 | 30.0 | 35.22 | 66 | D | D | B |
| Example 7 | 10.7 | 11.90 | 59 | A | A | A |
| Example 8 | 10.5 | 12.00 | 52 | B | A | A |

<<Manufacture of Non-Aqueous Secondary Battery of Second Embodiment>>

Example 101

—Manufacture of Positive Electrode—

94 parts by mass of lithium cobaltate powder, 3 parts by mass of acetylene black, 3 parts by mass of polyvinylidene fluoride resin, and an appropriate amount of N-methyl-2-pyrrolidone were kneaded to prepare slurry. The slurry was applied onto an aluminum foil having a thickness of 20 µm, dried, and then pressed to obtain a positive electrode (single-sided coating, basis weight 20.5 mg/$cm^2$, density of 2.95 g/$cm^3$).

—Manufacture of Negative Electrode—

96.2 parts by mass of graphite powder, 2.8 parts by mass of a modified product of a styrene-butadiene copolymer, 1.0 parts by mass of carboxymethyl cellulose, and an appropriate amount of water were kneaded to prepare a slurry. The slurry was applied onto a copper foil having a thickness of 15 µm, dried, and then pressed to obtain a negative electrode (single-sided coating, basis weight 10.0 mg/$cm^2$, density of 1.60 g/$cm^3$).

—Manufacture of Insulating Layer—

A VDF-HFP-acrylic acid terpolymer in which the ratio of HFP in all polymerization components was 2.4 mol % and the ratio of acrylic acid in all the polymerization components was 0.5 mol % was prepared. This resin is referred to as a PVDF resin (A).

The PVDF resin (A) was dissolved in a mixed solvent (DMAc:TPG=80:20 [content ratio]) of dimethylacetamide (DMAc) and tripropylene glycol (TPG) so as to have a concentration of 5% by mass, and then the magnesium hydroxide particles (average primary particle size: 0.88 µm) were added and stirred and mixed, thereby obtaining a coating liquid A. The content ratio of the PVDF resin (A) to the magnesium hydroxide particles (PVDF resin (A):magnesium hydroxide particles) was 20:80.

The coating liquid (A) was applied onto the negative electrode active material layer using a knife coater. The obtained product was immersed in a coagulation liquid (DMAc:water=50:50 [content ratio], liquid temperature 25° C.) for 5 minutes to solidify the coating layer, and then washed in a water washing tank having a water temperature of 25° C. The obtained product was taken out from the water washing tank, placed in a thermostatic tank at 70° C., dried for 15 minutes, and then dried under reduced pressure at 110° C. for 3 hours. In this way, a composite in which a single insulating layer was disposed on the negative electrode was obtained.

—Manufacture of Battery—

The positive electrode was cut into a size of 5.0 cm×3.0 cm, and the composite having the insulating layer disposed on the negative electrode was cut into a size of 5.2 cm×3.2 cm, and a lead tab was welded to each of the positive electrode and the composite. The positive electrode and the composite were layered one on another so that the positive electrode active material layer and the insulating layer were in contact with each other, thereby obtaining a laminate. The laminate was impregnated with an electrolytic solution and sealed in an exterior material of an aluminum laminate film. The electrode and the insulating layer were bonded by the hot press (85° C., 0.5 MPa, for 2 min) from above the exterior material, thereby obtaining a battery. As the electrolytic solution, 1 mol/L $LiPF_6$-ethylene carbonate:ethyl methyl carbonate (content ratio 3:7) was used. The battery had a set capacity of 40 mAh (range of from 4.2 V to 2.5 V).

Examples 102 to 109 and Comparative Examples 101 to 103

Each battery was manufactured in the same manner as in Example 101, except that the material, composition, and thickness of the insulating layer were specified as shown in Table 2.

A PVDF resin (B) used in Example 106 and the like is a VDF-HFP-acrylic acid terpolymer in which the ratio of the HFP in all polymerization components is 5.7 mol %, and the ratio of acrylic acid in all the polymerization components is 0.8 mol %.

A PVDF resin (C) used in Comparative Example 103 is a VDF-HFP binary copolymer in which the ratio of the HFP in all polymerization components is 2.5 mol %.

In Examples 105 and 109, magnesium hydroxide particles and barium sulfate particles were used in combination at magnesium hydroxide particles:barium sulfate particles=50:50 (content ratio).

Reference Example 101

—Manufacture of 3-Layer Separator—

Using a reverse roll coater, the coating liquid (A) was applied to both sides of a polyethylene microporous film (thickness: 7 μm, porosity: 36%, Gurley value: 120 seconds/100 mL) in equal amounts. The obtained product was immersed in a coagulation liquid (DMAc:water=50:50 [content ratio], liquid temperature 40° C.) to solidify the coating layer, then washed in a water washing tank having a water temperature of 40° C., and dried. In this way, the separator in which the coating layer was formed on both surfaces of the polyethylene microporous film was obtained.

—Manufacture of Battery—

A positive electrode and a negative electrode in Example 101 were prepared. The positive electrode was cut into a size of 5.0 cm×3.0 cm, and the negative electrode was cut into a size of 5.2 cm×3.2 cm, and a lead tab was welded to each of the positive electrode and the negative electrode. The separator was cut into a size of 5.4 cm×3.4 cm.

The positive electrode, the separator, and the negative electrode were layered one on another in this order so that the electrode active material layer was in contact with the separator, thereby obtaining a laminate. The laminate was impregnated with an electrolytic solution (the same electrolytic solution as used in Example 101), and sealed in an exterior material of an aluminum laminate film. The electrode and the separator were bonded by the hot press (85° C., 0.5 MPa, for 2 min) from above the exterior material, thereby obtaining a battery.

The compositions, physical properties and evaluation results of the batteries of Examples 101 to 109, Comparative Examples 101 to 103 and Reference Example 101 are each shown in Table 2.

TABLE 2

| | PVDF | Inorganic Particles | | Composition | | Insulating |
|---|---|---|---|---|---|---|
| | resin Kind — | Kind — | Average Primary Particle Size μm | Resin % by mass | Inorganic Particle % by mass | Layer Thickness μm |
| Reference Example 101 | (A) | Mg $(OH)_2$ | 0.88 | 20 | 80 | Single Side of Coating Layer 1.1 |
| Example 101 | (A) | Mg $(OH)_2$ | 0.88 | 20 | 80 | 6.6 |
| Example 102 | (A) | Mg $(OH)_2$ | 0.88 | 40 | 60 | 7.0 |
| Example 103 | (A) | $BaSO_4$ | 0.05 | 20 | 80 | 8.2 |
| Example 104 | (A) | $BaSO_4$ | 0.05 | 20 | 80 | 21.0 |
| Example 105 | (A) | Mg $(OH)_2$<br>$BaSO_4$ | 0.88<br>0.05 | 20 | 80 | 9.9 |
| Comparative Example 101 | (A) | — | — | 100 | 0 | 6.0 |
| Example 106 | (B) | Mg $(OH)_2$ | 0.88 | 20 | 80 | 6.4 |
| Example 107 | (B) | Mg $(OH)_2$ | 0.88 | 40 | 60 | 8.2 |
| Example 108 | (B) | $BaSO_4$ | 0.05 | 20 | 80 | 8.1 |
| Example 109 | (B) | Mg $(OH)_2$<br>$BaSO_4$ | 0.88<br>0.05 | 20 | 80 | 10 |
| Comparative Example 102 | (B) | — | — | 100 | 0 | 7.2 |
| Comparative Example 103 | (C) | Mg $(OH)_2$ | 0.88 | 20 | 80 | 7.1 |

| | Insulating Layer | | Performance of Battery | | |
|---|---|---|---|---|---|
| | Mass per Unit Area $g/m^2$ | Porosity % | Discharge Characteristic — | Coulombic Efficiency — | Cell Strength — |
| Reference Example 101 | Single Side of Coating Layer 1.05 | Coating Layer 57 | — | — | — |
| Example 101 | 6.52 | 55 | A | A | A |
| Example 102 | 9.00 | 35 | B | B | A |
| Example 103 | 16.20 | 43 | A | A | A |
| Example 104 | 28.31 | 61 | B | A | A |

TABLE 2-continued

| | | | | | |
|---|---|---|---|---|---|
| Example 105 | 11.52 | 57 | A | A | A |
| Comparative Example 101 | 7.00 | 34 | D | D | A |
| Example 106 | 6.30 | 56 | A | A | A |
| Example 107 | 9.40 | 47 | B | A | A |
| Example 108 | 15.22 | 45 | A | A | A |
| Example 109 | 12.00 | 55 | A | A | A |
| Comparative Example 102 | 7.11 | 45 | D | D | A |
| Comparative Example 103 | 7.32 | 42 | D | D | A |

<<Manufacture of Non-Aqueous Secondary Battery of Third Embodiment>>

Example 201

—Manufacture of Positive Electrode—

94 parts by mass of lithium cobaltate powder, 3 parts by mass of acetylene black, 3 parts by mass of polyvinylidene fluoride resin, and an appropriate amount of N-methyl-2-pyrrolidone were kneaded to prepare slurry. The slurry was applied onto an aluminum foil having a thickness of 20 μm, dried, and then pressed to obtain a positive electrode (single-sided coating, basis weight 20.5 mg/cm$^2$, density of 2.95 g/cm$^3$).

—Manufacture of Negative Electrode—

96.2 parts by mass of graphite powder, 2.8 parts by mass of a modified product of a styrene-butadiene copolymer, 1.0 parts by mass of carboxymethyl cellulose, and an appropriate amount of water were kneaded to prepare a slurry. The slurry was applied onto a copper foil having a thickness of 15 μm, dried, and then pressed to obtain a negative electrode (single-sided coating, basis weight 10.0 mg/cm$^3$, density of 1.60 g/cm$^3$).

—Manufacture of Insulating Layer—

The VDF-HFP binary copolymer (ratio of HFP in all polymerization components: 2.4 mol %) was dissolved in a mixed solvent (DMAc:TPG=80:20 [content ratio]) of dimethylacetamide (DMAc) and tripropylene glycol (TPG) so as to have a concentration of 5% by mass, and then the barium sulfate particles (average primary particle size: 0.05 μm) were added and stirred and mixed, thereby obtaining a coating liquid (201). The content ratio (VDF-HFP binary copolymer:barium sulfate particles) of the VDF-HFP binary copolymer and the barium sulfate particles was 20:80.

The coating liquid (201) was applied onto the negative electrode active material layer using a knife coater. The obtained product was immersed in a coagulation liquid (DMAc:water=50:50 [content ratio], liquid temperature 25° C.) for 5 minutes to solidify the coating layer, and then washed in a water washing tank having a water temperature of 25° C. The obtained product was taken out from the water washing tank, placed in a thermostatic tank at 70° C., dried for 15 minutes, and then dried under reduced pressure at 110° C. for 3 hours. In this way, a composite in which a single insulating layer was disposed on the negative electrode was obtained.

—Manufacture of Battery—

The positive electrode was cut into a size of 5.0 cm×3.0 cm, and the composite having the insulating layer disposed on the negative electrode was cut into a size of 5.2 cm×3.2 cm, and a lead tab was welded to each of the positive electrode and the composite. The positive electrode and the composite were layered one on another so that the positive electrode active material layer and the insulating layer were in contact with each other, thereby obtaining a laminate. The laminate was impregnated with an electrolytic solution and sealed in an exterior material of an aluminum laminate film. The electrode and the insulating layer were bonded by the hot press (85° C., 0.5 MPa, for 2 min) from above the exterior material, thereby obtaining a battery. As the electrolytic solution, 1 mol/L $LiPF_6$-ethylene carbonate:ethyl methyl carbonate (content ratio 3:7) was used. The battery had a set capacity of 40 mAh (range of from 4.2 V to 2.5 V).

Examples 202 to 207 and Comparative Examples 201 to 206

Each battery was manufactured in the same manner as in Example 201, except that the material, composition, and thickness of the insulating layer were specified as shown in Table 3.

Reference Example 201

—Manufacture of 3-Layer Separator—

Using a reverse roll coater, the coating liquid (201) was applied to both sides of a polyethylene microporous film (thickness: 7 μm, porosity: 36%, Gurley value: 120 seconds/100 mL) in equal amounts. The obtained product was immersed in a coagulation liquid (DMAc:water=50:50 [content ratio], liquid temperature 40° C.) to solidify the coating layer, then washed in a water washing tank having a water temperature of 40° C., and dried. In this way, the separator in which the coating layer was formed on both surfaces of the polyethylene microporous film was obtained.

—Manufacture of Battery—

A positive electrode and a negative electrode in Example 201 were prepared. The positive electrode was cut into a size of 5.0 cm×3.0 cm, and the negative electrode was cut into a size of 5.2 cm×3.2 cm, and a lead tab was welded to each of the positive electrode and the negative electrode. The separator was cut into a size of 5.4 cm×3.4 cm.

The positive electrode, the separator, and the negative electrode were layered one on another in this order so that the electrode active material layer was in contact with the separator, thereby obtaining a laminate. The laminate was impregnated with an electrolytic solution (the same electrolytic solution as used in Example 201), and sealed in an exterior material of an aluminum laminate film. The electrode and the separator were bonded by the hot press (85° C., 0.5 MPa, for 2 min) from above the exterior material, thereby obtaining a battery.

The compositions, physical properties and evaluation results of the batteries of Examples 201 to 207, Comparative Examples 201 to 206 and Reference Example 201 are each shown in Table 3.

TABLE 3

| | Resin Kind — | Inorganic Particle Kind — | Inorganic Particle Average Primary Particle Size μm | Composition Resin % by mass | Composition Inorganic Particle % by mass | Insulating Layer Thickness μm | Insulating Layer Mass per Unit Area $g/m^2$ |
|---|---|---|---|---|---|---|---|
| Reference Example 201 | VDF-HFP | $BaSO_4$ | 0.05 | 20 | 80 | Single Side of Coating Layer 1.1 | Single Side of Coating Layer 1.05 |
| Example 201 | VDF-HFP | $BaSO_4$ | 0.05 | 20 | 80 | 9.0 | 17.77 |
| Example 202 | VDF-HFP | $BaSO_4$ | 0.05 | 20 | 80 | 19.9 | 30.34 |
| Example 203 | VDF-HFP | $BaSO_4$ | 0.05 | 40 | 60 | 6.2 | 9.33 |
| Example 204 | VDF-HFP | $BaSO_4$ | 0.005 | 20 | 80 | 8.6 | 17.63 |
| Example 205 | VDF-HFP | $BaSO_4$ | 1.00 | 20 | 80 | 8.9 | 17.95 |
| Comparative Example 201 | VDF-HFP | — | — | 100 | 0 | 6.0 | 7.05 |
| Comparative Example 202 | VDF-HFP | $SiO_2$ | 0.60 | 20 | 80 | 8.6 | 9.11 |
| Comparative Example 203 | VDF-HFP | AlOOH | 0.70 | 20 | 80 | 8.5 | 13.21 |
| Comparative Example 204 | VDF-HFP | α alumina | 0.60 | 20 | 80 | 8.2 | 15.57 |
| Example 206 | VDF-HFP | $BaSO_4$ | 0.05 | 20 | 80 | 5.2 | 9.80 |
| Example 207 | VDF-HFP | $BaSO_4$ | 0.05 | 20 | 80 | 28.0 | 45.00 |
| Comparative Example 205 | VDF-HFP | $BaSO_4$ | 0.05 | 20 | 80 | 3.9 | 7.20 |
| Comparative Example 206 | VDF-HFP | $BaSO_4$ | 0.05 | 20 | 80 | 59.7 | 78.22 |

| | Insulating Layer Porosity % | Performance of Battery: Discharge Characteristic — | Discharge capacity retention ratio — | Micro-short Circuit — | Cell Strength — |
|---|---|---|---|---|---|
| Reference Example 201 | Coating Layer 45 | — | — | — | — |
| Example 201 | 43 | A | A | A | A |
| Example 202 | 56 | A | A | A | A |
| Example 203 | 46 | B | A | A | A |
| Example 204 | 40 | C | A | A | A |
| Example 205 | 41 | A | A | A | B |
| Comparative Example 201 | 34 | D | A | A | B |
| Comparative Example 202 | 56 | B | A | B | B |
| Comparative Example 203 | 42 | B | A | B | B |
| Comparative Example 204 | 41 | B | A | B | B |
| Example 206 | 45 | A | A | A | B |
| Example 207 | 53 | B | A | A | A |
| Comparative Example 205 | 46 | A | A | B | B |
| Comparative Example 206 | 62 | D | A | A | A |

The disclosure of Japanese Patent Application No. 2020-127692 filed on Jul. 28, 2020 is incorporated herein by reference in its entirety. The disclosure of Japanese Patent Application No. 2020-127693 filed on Jul. 28, 2020 is incorporated herein by reference in its entirety. The disclosure of Japanese Patent Application No. 2020-127694 filed on Jul. 28, 2020 is incorporated herein by reference in its entirety.

All documents, patent applications, and technical standards described in this specification are incorporated herein by reference to the same extent as if each individual document, patent application, and technical standards were specifically and individually indicated to be incorporated herein by reference.

The invention claimed is:

1. A non-aqueous secondary battery, comprising:

a positive electrode;

a negative electrode;

an insulating layer that is a single layer contacting the positive electrode on one side and contacting the negative electrode on another side, the insulating layer comprising a polyvinylidene fluoride type resin and inorganic particles; and an electrolyte, wherein a content ratio of the polyvinylidene fluoride type resin in the insulating layer is 100% by mass based on a total amount of all resins contained in the insulating layer, wherein a weight-average molecular weight of the polyvinylidene fluoride type resin contained in the insulating layer is from 900,000 to 1,500,000, and wherein a content ratio of the inorganic particles in the insulating layer is from 50% by mass to less than 90% by mass, and wherein a mass per unit area of the insulating layer is from 9 $g/m^2$ to less than 40 $g/m^2$.

2. The non-aqueous secondary battery according to claim 1, wherein the inorganic particles contain at least one selected from the group consisting of metal hydroxide particles and metal sulfate particles.

3. The non-aqueous secondary battery according to claim 1, wherein an average primary particle size of the inorganic particles contained in the insulating layer is from 0.01 μm to less than 1.00 μm.

4. The non-aqueous secondary battery according to claim 1, wherein a thickness of the insulating layer is from 5 μm to 30 μm.

5. The non-aqueous secondary battery according to claim 1, wherein a porosity of the insulating layer is from 40% to less than 80%.

6. The non-aqueous secondary battery according to claim 1, wherein the non-aqueous secondary battery obtains electromotive force by lithium doping and dedoping.

7. A non-aqueous secondary battery, comprising:

a positive electrode;

a negative electrode;

an insulating layer that is a single layer contacting the positive electrode on one side and contacting the negative electrode on another side, the insulating layer comprising a polyvinylidene fluoride type resin and inorganic particles, the polyvinylidene fluoride type resin comprising, as polymerizing components, vinylidene fluoride and a monomer represented by the following formula (1); and an electrolyte, wherein a content ratio of the polyvinylidene fluoride type resin in the insulating layer is 100% by mass based on a total amount of all resins contained in the insulating layer, and wherein a thickness of the insulating layer is from 10 μm to 30 μm:

Formula (1)

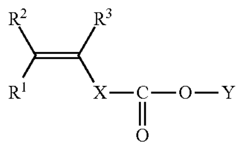

wherein, in Formula (1), each of $R^1$, $R^2$, and $R^3$ independently represents a hydrogen atom, a halogen atom, a $C_{1-5}$ alkyl group, a carboxyl group or a derivative of a carboxyl group; X represents a single bond, a $C_{1-5}$ alkylene group, or a substituted $C_{1-5}$ alkylene group; and Y represents a hydrogen atom, a $C_{1-5}$ alkyl group, a $C_{1-5}$ alkyl group that contains at least one hydroxy group, a $C_{1-5}$ alkyl group that contains at least one carboxyl group, or $—R—O—C(=O)—(CH_2)_n—C(=O)—OH$, wherein R represents a $C_{1-5}$ alkylene group and n represents an integer of 0 or more.

8. The non-aqueous secondary battery according to claim 7, wherein a mass per unit area of the insulating layer is from 4 $g/m^2$ to less than 40 $g/m^2$.

9. The non-aqueous secondary battery according to claim 7, wherein a content ratio of the inorganic particles in the insulating layer is from 50% by mass to less than 90% by mass.

10. A non-aqueous secondary battery, comprising:

a positive electrode;

a negative electrode;

an insulating layer that is a single layer contacting the positive electrode on one side and contacting the negative electrode on another side, the insulating layer comprising a polyvinylidene fluoride type resin and inorganic particles; and an electrolyte, wherein a weight-average molecular weight of the polyvinylidene fluoride type resin contained in the insulating layer is from 900,000 to 1,500,000, wherein a content ratio of the polyvinylidene fluoride type resin in the insulating layer is 100% by mass based on a total amount of all resins contained in the insulating layer, wherein the polyvinylidene fluoride type resin is a VDF-HFP binary copolymer, wherein a thickness of the insulating layer is from 5 μm to 30 μm, and wherein the inorganic particles include metal sulfate particles.

11. The non-aqueous secondary battery according to claim 10, wherein an average primary particle size of the metal sulfate particles is from 0.01 μm to 1.00 μm.

* * * * *